US012665203B2

(12) United States Patent
Berben

(10) Patent No.: US 12,665,203 B2
(45) Date of Patent: Jun. 23, 2026

(54) ORGANO-METALLIC ANALYTES FOR NONAQUEOUS REDOX FLOW BATTERIES

(71) Applicant: The Regents of the University of California, Oakland, CA (US)

(72) Inventor: Louise A. Berben, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 553 days.

Patent file contains an affidavit/declaration under 37 CFR 1.130(b).

(21) Appl. No.: 18/024,353

(22) PCT Filed: Sep. 10, 2021

(86) PCT No.: PCT/US2021/049878
§ 371 (c)(1),
(2) Date: Mar. 2, 2023

(87) PCT Pub. No.: WO2022/056272
PCT Pub. Date: Mar. 17, 2022

(65) Prior Publication Data

US 2023/0317967 A1 Oct. 5, 2023

Related U.S. Application Data

(60) Provisional application No. 63/077,422, filed on Sep. 11, 2020.

(51) Int. Cl.

| | |
|---|---|
| ***H01M 4/90*** | (2006.01) |
| ***C07F 5/06*** | (2006.01) |
| ***H01M 8/18*** | (2006.01) |

(52) U.S. Cl.
CPC ........... *H01M 4/9008* (2013.01); *C07F 5/069* (2013.01); *H01M 8/188* (2013.01)

(58) Field of Classification Search
CPC ......... H01M 8/18–188; H01M 4/9008; H01M 2008/1095; H01M 2300/0025; C07F 5/069; Y02E 60/10; C07D 213/53
See application file for complete search history.

(56) References Cited

U.S. PATENT DOCUMENTS

| | | | |
|---|---|---|---|
| 2005/0164075 A1 | 7/2005 | Kumamoto et al. | |
| 2017/0187059 A1* | 6/2017 | Potash .............. | H01M 8/04276 |
| 2019/0168203 A1 | 6/2019 | Holtcamp et al. | |

FOREIGN PATENT DOCUMENTS

| | | |
|---|---|---|
| EP | 2 903 079 A1 | 8/2015 |

OTHER PUBLICATIONS

Arnold et al., "A Stable Organo-Aluminum Analyte Enables Multielectron Storage for a Nonaqueous Redox Flow Battery"—NPL (Year: 2020).*

(Continued)

*Primary Examiner* — Allison Bourke
*Assistant Examiner* — Bethany C Garcia
(74) *Attorney, Agent, or Firm* — Lathrop GPM LLP; Lisbeth Robinson

(57) ABSTRACT

The present disclosure features organometallic materials and methods for electrical energy storage. For example, molecular redox-active bis(imino)pyridine ligands and Group 13 metal-bis(imino)pyridine complexes for use as Non-Aqueous Redox Flow Battery (NRFB) analytes are provided. Also provided are NRFBs and electrical energy storage systems comprising Group 13 metal-bis(imino)pyridine complexes as analytes.

20 Claims, 25 Drawing Sheets

$(I_2P)(I_2P^{\cdot-})$

1

$(I_2P^{\cdot-})_2$

2a X = $PF_6$

2b X = OTf $(I_2P^{\cdot-})(I_2P^{2\cdot-})$

3

(56) References Cited

OTHER PUBLICATIONS

Arnold et al., "A Stable Organo-Aluminum Analyte Enables Multielectron Storage for a Nonaqueous Redox Flow Battery"—Supporting Information (Year: 2020).*
Duarte et al., "Redox non-innocent bis(2,6-diimine-pyridine) ligand-iron complexes as anolytes for flow battery applications," Dalton Trans., 2017, 46, 16439 (Year: 2017).*
Arnold et al., "A Stable Organo-Aluminum Analyte Enables Multie-Electron Storage for a Nonaqueous Redox Flow Battery", J. Phys. Chem. Lett, 11(19):8202-8207 (Sep. 8, 2020). https://doi.org/10.1021/acs.jpclett.0c01761.
Duarte et al., "Redox Non-Innocent Bis(2,6-diimine-pyridine) Ligand-Iron Complexes as Anolytes for Flow Battery Applications", Dalton Trans. 46:16439-16445 (Nov. 13, 2017). https://doi.org/10.1039/c7dt03915h.
International Search Report and Written Opinion mailed Dec. 29, 2021 for corresponding International Patent Application No. PCT/US/2021/049878.
Shigematsu, "Redox Flow Battery for Energy Storage", SEI Tech Review, 73:1-13 (Oct. 2011).
VanGelder et al., (2018). "Organic Functionalization of Polyoxovanadate-Alkoxide Clusters: Improving the Solubility of Multimetallic Charge Carriers for Nonaqueous Redox Flow Batteries". ChemSusChem. 11. 10.1002/cssc.201802029.
VanGelder et al. (2018). "Polyoxovanadate-alkoxide Clusters as Multi-electron Charge Carriers for Symmetric Non-aqueous Redox Flow Batteries". Chemical Science. 9. 10.1039/C7SC05295B.
Gong et al. (2015). "Nonaqueous redox-flow batteries: Organic solvents, supporting electrolytes, and redox pairs". Energy Environ. Sci.. 8. 10.1039/C5EE02341F.
Kowalski et al., (2016). "Recent advances in molecular engineering of redox active organic molecules for nonaqueous flow batteries". Current Opinion in Chemical Engineering, 13, 45-52.
Cabrera et al. (2015). "Complexes Containing Redox Noninnocent Ligands for Symmetric, Multielectron Transfer Nonaqueous Redox Flow Batteries". The Journal of Physical Chemistry C. 119 (28), 15882-15889 DOI: 10.1021/acs.jpcc.5b03582 (Abstract Only).
Arnold et al. (2019). "Organic Electron Delocalization Modulated by Ligand Charge States in [L2M]n-Complexes of Group 13 Ions". Journal of the American Chemical Society. 141. 10.1021/jacs.9b05602. (Abstract Only).

* cited by examiner

Asymmetric / 4 e⁻ per cycle

Symmetric / 2 e⁻ per cycle $(I_2P)(I_2P^-)$

1

$(I_2P^-)_2$

2a X = $PF_6$

2b X = OTf $(I_2P^-)(I_2P^{2-})$

3

ORGANO-METALLIC ANALYTES FOR NONAQUEOUS REDOX FLOW BATTERIES

CROSS-REFERENCE TO RELATED APPLICATIONS

This application is a national stage application, filed under 35 U.S.C. § 371, of International Patent Application No. PCT/US2021/049878, filed on Sep. 10, 2021, which claims the benefit of U.S. Provisional Patent Application No. 63/077,422, filed Sep. 11, 2020, each of which is incorporated by reference herein in its entirety.

FEDERALLY SPONSORED RESEARCH OR DEVELOPMENT

This invention was made with government support under contracts N00014-17-1-2811 and N00014-20-1-2264 awarded by Office of Naval Research NEPTUNE program. The government has certain rights in the invention.

BACKGROUND

Intermittent renewable energy technologies, such as wind and solar, produce excess amounts of electricity at certain times of day and this has created a need to store on-grid electricity for when it is sought by the end user. A potential solution to storing sizable amounts of electricity is via redox flow batteries (RFBs), which are known for having long lifetimes and very safe operation relative to other common commercial battery options. Commercial deployments of RFB's to date primarily employ the aqueous vanadium ion redox flow battery, which has a maximum cell potential ($V_{cell}$) of 1.25-1.5 V. Use of non-aqueous solvents in RFB's is an alternative option to classical aqueous RFB technology and this would open up the molecular analyte possibilities to include both organic, and metal-containing organic systems.

There is a need for further understanding of the interplay between molecular structure and electron delocalization (related to $V_{cell}$), by synthesis of new molecules and characterization of their electronic structures. Analyte molecules that store multiple electrons while maintaining characteristics of a desirable characteristics for a flow analyte (water-stability, overall cell stability, concentration dependence, analyte crossover, and Coulombic efficiency) have been prepared. These efforts yielded analytes with various limitations including poor solubility, high cost and low availability for certain metal ions, multi-step synthesis methods, and/or instability. Analytes with higher availability metal ions and stability, which can be made using more efficient synthesis methods are needed to access additional redox features in the redox-flow battery configuration.

SUMMARY

The present disclosure features materials and methods for electrical energy storage. For example, molecular redox-active ligands and Group 13 metal-ligand complexes for use as Non-Aqueous Redox Flow Battery (NRFB) analytes are provided. Analytes with Group 13 metal ions, such as aluminum, complexed with the redox-active ligands of the present disclosure exhibit improved stability and permit more electron transfer events via the organic ligands. These improvements are observed relative to all-organic analytes and redox-active metal/organic analytes described previously.

In a first aspect, the present disclosure describes an organometallic complex for use as a non-aqueous redox flow battery (NRFB) analyte according to Formula I:

$$L_1—M—L_2$$

or a salt thereof, wherein M is a Group 13 metal and ligands $L_1$ and $L_2$ are independently selected from bis(imino)pyridine compounds of Formula II:

(II)

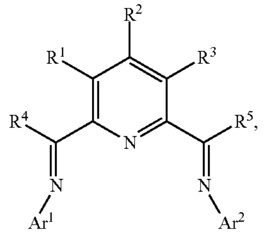

wherein $R^1$, $R^2$, and $R^3$ are independently selected from a hydrogen atom; hydrocarbon groups R, as defined below, having one to twenty carbon atoms with optional inclusion of one or more heteroatoms selected from oxygen, nitrogen, silicon, sulfur, and halogen atoms, wherein the hydrocarbon group is attached to the pyridine ring by a carbon atom; halogen atoms; hydroxy groups; nitrile groups; amino groups —$NR^{11}R^{12}$; ether groups —OR; carboxamide groups —$C(O)NR^{11}R^{12}$ or —$NR^{11}C(O)R$; keto groups —C(O)R, carboxylic acid groups —C(O)OH or salt thereof; ester groups —C(O)OR; sulfonate groups; phosphonate groups; silyl groups, and nitrate groups; wherein $R^{11}$ and $R^{12}$ are independently selected from a hydrogen atom and hydrocarbon groups and R is a hydrocarbon group.

$R^4$ and $R^5$ are independently selected from a hydrogen atom; hydrocarbon groups R, as defined below, having one to twenty carbon atoms with optional inclusion of one or more heteroatoms selected from oxygen, nitrogen, sulfur, and halogen atoms, wherein the hydrocarbon group is attached to the imine group by a carbon atom; and $Ar^1$ and $Ar^2$ are independently selected from substituted phenyl groups. In one embodiment of the first aspect, when $R^1$, $R^2$, and $R^3$ are hydrogen, and $R^4$ and $R^5$ are phenyl groups, $Ar^1$ and $Ar^2$ are not 2-methoxyphenyl groups. In some embodiments, $Ar^1$ and $Ar^2$ are independently selected from a substituted phenyl group according to Formula III:

(III)

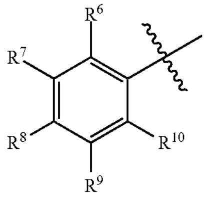

wherein at least one of $R^6$, $R^7$, $R^8$, $R^9$, and $R^{10}$ are independently hydrocarbon groups R, as described below, having one to twenty carbon atoms with optional inclusion of one or more heteroatoms selected from oxygen, nitrogen, silicon, sulfur, and halogen atoms, wherein the hydrocarbon group is attached to the pyridine ring by a carbon atom; halogen atoms; hydroxy groups; nitrile groups; amino groups —$NR^{11}R^{12}$, ether groups —OR; carboxamide groups —$C(O)NR^{11}R^{12}$ or —$NR^{11}C(O)R$; keto groups —C(O)R, carboxylic acid groups —C(O)OH or salt thereof; ester groups —C(O)OR; sulfonate groups; phosphonate groups; silyl groups, and nitrate groups; wherein $R^{11}$ and $R^{12}$ are independently selected from a hydrogen atom and hydrocarbon groups and R is a hydrocarbon group, as described below.

In some embodiments, $R^1$ and $R^3$ are hydrogen, $R^2$ is chlorine, bromine, alkynyl, phenylethynyl, or TMS-ethynyl, $R^4$ and $R^5$ are phenyl groups, and $Ar^1$ and $Ar^2$ are independently a 2-, 3-, or 4-alkylphenyl group, a 2,3-dialkylphenyl group, a 2,4-dialkylphenyl group, a 3,4-dialkylphenyl group, a 2,3,4-trialkylphenyl group, a perhalophenyl group, a 2-, 3-, or 4-methoxyphenyl group, or a 2-, 3-, or 4-dimethylaminophenyl group. M can be Al, Ga, or In. In some cases, M is Al:

In some embodiments, the organometallic complex of formula I is a salt with a counter ion selected from the group consisting of $AlCl_4^-$, $BPh_4^-$, $BF_4^-$, $PF_6^-$, $AsF_6^-$, $SbF_6^-$, $OTeF_5^-$, $OClO_3^-$, $(CF_3SO_2)_2N^-$ and $CF_3SO_3^-$.

In some cases, the NRFB analyte comprises an organometallic salt represented by formula IV:

(IV)

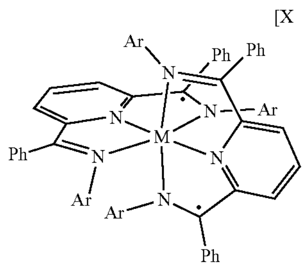

wherein M is a Group 13 metal, Ph is phenyl, Ar is a substituted phenyl group, and X is a counter-ion that enhances the solubility of the organometallic complex in a desired solvent, e.g., an electrolyte solution comprising acetonitrile, as compared to the organometallic complex in its neutral state. X can be $PF_6^-$, $BF_4^-$, $(CF_3SO_2)_2N^-$, $CF_3SO_3^-$, or $AlCl_4$. Ar can be 2-methoxyphenyl. In one embodiment of the first aspect, Ar of formula IV is not 2-methoxyphenyl.

In a second aspect, the present disclosure features a Non-Aqueous Redox-Flow Battery (NRFB) comprising: (a) a negative compartment containing a negative electrode disposed within a non-aqueous liquid electrolyte solution; (b) a positive compartment containing a positive electrode disposed within the non-aqueous liquid electrolyte solution; (c) a separator interposed between the positive compartment and the negative compartment; wherein at least one of the negative compartment and the positive compartment comprises an NRFB analyte comprising the organometallic complex of any embodiment of the first aspect described above, or any combination of embodiments of the first aspect described above. Both the negative and positive compartments can include the NRFB analyte. Only one of the negative and positive compartments can include the NRFB analyte. The organometallic complex can be dissolved in a non-aqueous solvent. The organometallic complex concentration in the non-aqueous solvent can be about 5 mM to about 50 mM, about 5 mM to about 25 mM or about 5 to about 15 mM. The non-aqueous solvent can be selected from the group consisting of acetonitrile, gamma-butyrolactone, a cyclic carbonate, propylene carbonate, ethylene carbonate, butylene carbonate, dimethyl carbonate, diethyl carbonate, N-methyl-2-pyrrolidone, N,N-dimethylformamide, N,N-dimethylacetamide, dimethylsulfoxide, dimethyl sulfone, sulfolane, chlorobenzene, cyclopentanone, tetrahydrofuran, 1,4-dioxane, methanol, ethanol, ethylene glycol, diethylene glycol, triethylene glycol, tetraethylene glycol, their mono or di-methyl ethers, 1,3-dioxolane, 1,2 propylene glycol, 1,3 propylene glycol and mixtures thereof. The mixture can be a binary, ternary, or quaternary mixture. The positive and negative electrodes independently include or are selected from C, Si, Ga, In, Al, Ti, V, Cr, Fe, Co, Ni, Cu, Zr, Nb, Ta, Mo, W, Re, Ru, Os, Rh, Ir, Pd, Pt, Ag, Au, alloys thereof, degenerately-doped semiconductors thereof, and oxides thereof, graphite, carbon felt, glassy carbon, reticulated vitreous carbon, nickel on carbon, porous nickel sulfide, a carbon-polyolefin composite, a composite containing polyvinylidene difluoride (PVdF) and activated carbon, or a composite of platinum and titanium. In some cases, the positive and negative electrodes are graphite rods. The separator can include alumina, silica, glass, titania, zirconia, or an anion exchange membrane. In some cases, the separator is a glass frit. The liquid electrolyte solution can further include a supporting electrolyte. The supporting electrolyte can be selected from the group consisting of lithium, sodium, potassium, rubidium, magnesium, calcium, strontium, barium ammonium halides and organic ammonium halides, the group consisting of lithium phosphate, lithium hexafluorophosphate, lithium hexafluoroarsenate, lithium perchlorate, sodium perchlorate, lithium sulfate, magnesium sulfate, and ammonium perchlorate, or a mixture thereof. The supporting electrolyte concentration can be from about 0.01 M to about 10 M. The NRFB can be configured to establish electrical communication between the positive electrode, the negative electrode, and an external load directing electrical energy into or out of the NRFB, and/or to establish flow of the electrolyte solutions past the positive and negative electrodes, respectively. The NRFB can further include a storage tank containing additional electrolyte solution in fluidic communication with each of the positive and negative compartments.

In a third aspect, the present disclosure features a method of releasably storing electrical energy comprising connecting the NRFB of any embodiment of the second aspect, or any combination of embodiments of the second aspect, described above to an external power source and charging the NRFB to make a current to flow in, whereby the NRFB can be discharged by connecting it to an external circuit having an electric load to make a current to flow out. The NRFB charging and discharging cycles can remain stable for over 100 cycles at 70% state of charge and 97% Coulombic efficiency. In some cases, the cycles can remain stable for over 500 cycles. The NRFB can be connected to an electrical grid to allow renewables integration, peak load shifting, grid firming, baseload power generation and consumption, energy arbitrage, transmission and distribution asset deferral, weak grid support, frequency regulation, or any combination thereof.

In a fourth aspect, the present disclosure features an electrical energy storage system comprising one or more NRFB according to any of the embodiments of the second aspect, or any combination of embodiments described above connected to one or more power sources, and configured to store electrical energy from the one or more power sources.

The NRFB and the power source can be connected via an AC/DC converter. The system can include a plurality of connected NRFBs. The NRFBs of the plurality can be connected in series.

Unlike RFBs that employ all-organic analytes or organometal analytes where the metal participates in redox processes, the use of Group 13 metals, such as Al, in the NRFB analytes of the present disclosure provides stable molecules with high solubility and wide potential windows for NRFB's with higher energy storage capacity and wider range of temperature operation.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. The drawings illustrate generally, by way of example, but not by way of limitation, various embodiments discussed in the present document.

Reference is made to illustrative embodiments that are depicted in the figures, in which.

DETAILED DESCRIPTION

Figure 1A:
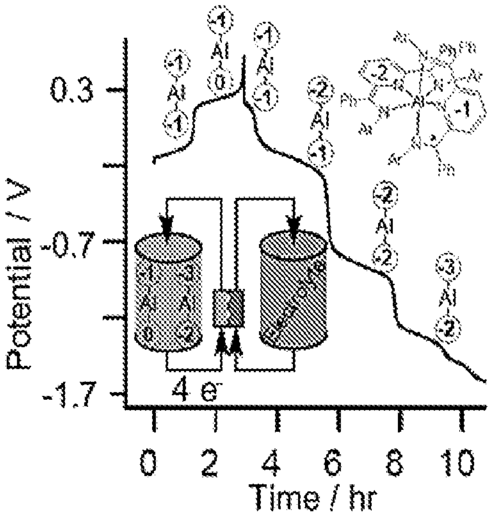
FIG. 1A-B show representative potential responses of an (A) asymmetric and (B) symmetric redox flow battery configuration according to one or more embodiments of the present disclosure.

The present disclosure features materials and methods for electrical energy storage, including molecular redox-active ligands and Group 13 metal-ligand complexes for use as Non-Aqueous Redox Flow Battery (NRFB) analytes.

As used herein, the term "hydrocarbon group" (also denoted by the group R) is, in a first embodiment, composed solely of carbon and hydrogen. In different embodiments, one or more of the hydrocarbon groups can contain precisely, or a minimum of, or a maximum of, for example, one, two, three, four, five, six, seven, eight, nine, ten, eleven, twelve, thirteen, fourteen, fifteen, sixteen, seventeen, eighteen, nineteen, or twenty carbon atoms, or a number of carbon atoms within a particular range bounded by any two of the foregoing carbon numbers. Hydrocarbon groups in different compounds described herein, or in different positions of a compound, may possess the same or different number of carbon atoms in order to independently adjust or optimize the activity or other characteristics of the compound.

The hydrocarbon groups (R) can be, for example, saturated and straight-chained (i.e., straight-chained alkyl groups). Some examples of straight-chained alkyl groups include methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, and n-eicosyl groups.

The hydrocarbon groups (R) can alternatively be saturated and branched (i.e., branched alkyl groups). Some examples of branched alkyl groups include isopropyl (2-propyl), isobutyl (2-methylprop-1-yl), sec-butyl (2-butyl), t-butyl (1,1-dimethylethyl-1-yl), 2-pentyl, 3-pentyl, 2-methylbut-1-yl, isopentyl (3-methylbut-1-yl), 1,2-dimethylprop-1-yl, 1,1-dimethylprop-1-yl, neopentyl (2,2-dimethylprop-1-yl), 2-hexyl, 3-hexyl, 2-methylpent-1-yl, 3-methylpent-1-yl, isohexyl (4-methylpent-1-yl), 1,1-dimethylbut-1-yl, 1,2-dimethylbut-1-yl, 2,2-dimethylbut-1-yl, 2,3-dimethylbut-1-yl, 3,3-dimethylbut-1-yl, 1,1,2-trimethylprop-1-yl, and 1,2,2-trimethylprop-1-yl groups, isoheptyl, isooctyl, and the numerous other branched alkyl groups having up to 20 carbon atoms, wherein the "1-yl" suffix represents the point of attachment of the group.

The hydrocarbon groups (R) can alternatively be saturated and cyclic groups. Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane).

The hydrocarbon groups (R) can alternatively be unsaturated and straight-chained (i.e., straight-chained olefinic or alkenyl groups). The unsaturation occurs by the presence of one or more carbon-carbon double bonds and/or one or more carbon-carbon triple bonds. Some examples of straight-chained olefinic groups include vinyl, propen-1-yl (allyl), 3-buten-1-yl ($CH_2$═CH—$CH_2$—$CH_2$—), 2-buten-1-yl ($CH_2$—CH═CH—$CH_2$—), butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, propargyl (2-propynyl), and the numerous other straight-chained alkenyl groups having up to 20 carbon atoms.

The hydrocarbon groups (R) can alternatively be unsaturated and branched (i.e., branched olefinic or alkenyl groups). Some examples of branched olefinic groups include propen-2-yl ($CH_2$═C·—$CH_3$), 1-buten-2-yl ($CH_2$═C·—$CH_2$—$CH_3$), 1-buten-3-yl ($CH_2$═CH—CH·—$CH_3$), 1-propen-2-methyl-3-yl ($CH_2$═C($CH_3$)—$CH_2$—), 1-penten-4-yl, 1-penten-3-yl, 1-penten-2-yl, 2-penten-2-yl, 2-penten-3-yl, 2-penten-4-yl, and 1,4-pentadien-3-yl, wherein the dot in any of the foregoing groups indicates a point of attachment.

The hydrocarbon groups (R) can alternatively be unsaturated and cyclic (i.e., cycloalkenyl groups). The unsaturated and cyclic group can be aromatic or aliphatic. Some examples of unsaturated and cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group can also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene fused ring systems.

One or more of the hydrocarbon groups (R) may (i.e., optionally) include one or more heteroatoms, which are non-carbon non-hydrogen atoms. Some examples of heteroatoms include oxygen (O), nitrogen (N), sulfur (S), silicon (Si) and halogen (halide) atoms. Some examples of halogen atoms include fluorine, chlorine, bromine, and iodine. In some embodiments, the heteroatom atom inserts between at least two carbon atoms (as in —C—O—C— ether, —C—S—C— thioether, —C—N(R)—C— tertiary amine, or —C═N—C— imine) or between at least one carbon atom and at least one hydrogen atom (as in —C—OH, —C—SH, —C—$NH_2$, —C—NH—C—, or —C(═NH)C—), wherein the shown carbon atom in each case can be considered part of a hydrocarbon group R described above. In other embodiments, the heteroatom replaces (i.e., substitutes) one or more hydrogen atoms and/or one or more carbon atoms in the hydrocarbon group, as in halogen-substituted groups (e.g., a —$CH_2$F, —$CHF_2$, and —$CF_3$) and carbonyl-substituted groups, such as ketone and aldehyde groups, and silyl groups (—$SiR'_3$). In some embodiments, the hydrocarbon is substituted with multiple oxygen atoms to result in a dialkyleneoxide or polyalkyleneoxide group, such as a diethyleneoxide or polyethyleneoxide group. In the case of nitrogen or sulfur substitution, the nitrogen or sulfur atom may be bonded to a sufficient number of groups to make it positively charged, as in an ammonium group (e.g., —$NR'_3{}^+$) or sulfonium group (e.g., —$SR'_2{}^+$), in which case the positively charged moiety is necessarily associated with a counteranion wherein R' independently represents hydrogen atom or any of the hydrocarbon groups described above. Likewise, a heteroatom may bear a negative charge, as in a deprotonated carboxy, thiocarboxy, sulfonate, phosphonate, hydroxy, or thiol group, in which case the negatively charged moiety is necessarily associated with a countercation.

When two or more same or different heteroatoms are bound to each other or located on the same carbon atom, the resulting group containing the heteroatoms is herein referred to as a "heteroatom-containing group". Thus, inclusion or substitution of a hydrocarbon group with one or more heteroatoms also includes heteroatom-containing groups, unless otherwise specified. Some examples of heteroatom-containing groups include carboxy (—C(O)OR' or —OC(O)R'), thiocarboxy (—C(S)OR' or —OC(S)R'), carboxamide (—C(O)$NR'_2$, —C(O)NR'—, or —N(R')C(O)—), urea (—NR'—C(O)—$NR'_2$ or —NR'—C(O)—NR'—), thiourea (—NR=—C(S)—$NR'_2$ or —NR'—C(S)—NR'—), carbamate (—NR'—C(O)—OR', —OC(O)—$NR'_2$, or —NR'—C(O)—O—), thiocarbamate (—NR'—C(S)—OR', —OC(S)—$NR'_2$, or —NR'—C(S)—O—), nitro ($NO_2$), nitrile (CN), sulfonyl (—$S(O)_2R'$ or —$S(O)_2$—), sulfinyl (i.e., sulfoxide, —S(O)R' or —S(O)—), disulfide (—C—S—S—C—), sulfonate (—$S(O)_2OR'$), sulfate (—$OS(O)_2OR'$), amine oxide (as typically found in a nitrogen-containing ring), wherein R' independently represents hydrogen atom or any of the hydrocarbon groups (R) described above. For example, —C(O)OR' includes carboxylic acid (—C(O)OH) and carboxylic ester (—C(O)OR), where R and R' is any of the hydrocarbon groups described above. The heteroatom-containing group may also either insert between carbon atoms or between a carbon atom and hydrogen atom, if applicable, or replace one or more hydrogen and/or carbon atoms.

In some embodiments, the hydrocarbon group (R) is substituted with one or more halogen atoms to result in a partially halogenated or perhalogenated hydrocarbon group. Some examples of partially halogenated hydrocarbon groups include —$CHY_2$, —$CH_2Y$, —$CH_2CY_3$, —$CH(CY_3)_2$, or a halo-, dihalo-, trihalo-, or tetrahalo-substituted phenyl group, wherein Y represents any of F, Cl, Br, or I. Some examples of perhalogenated hydrocarbon groups include —$CY_3$, —$CY_2CY_3$, —$CY_2CY_2CY_3$, —$CY(CY_3)_2$, or perhalophenyl, —$C_6Y_5$).

In some embodiments, the hydrocarbon group (R) is, or includes, a cyclic or polycyclic (i.e., bicyclic, tricyclic, or higher cyclic) saturated or unsaturated (e.g., aliphatic or aromatic) hydrocarbon group that includes at least one ring heteroatom, such as one, two, three, four, or higher number of ring heteroatoms.

In some embodiments, any of the generic substituents (e.g., $R_1$, $R_2$, and the like in Formula I) described above may independently exclude any one or more of the classes, subclasses, or particular hydrocarbon groups described above, or may independently include only specific hydrocarbon groups selected from the hydrocarbon groups (R) described above.

When referencing substituted compounds or groups, references to substitution patterns are taken to indicate that the indicated group(s) is (are) located at the indicated position and that all other non-indicated positions are hydrogen. For example, reference to a 4-substituted phenyl group indicates that there is a non-hydrogen substituent located at the 4 position and hydrogens located at the 2, 3, 5, and 6 positions. References to compounds or groups having substitutions at positions in addition to the indicated position will be referenced using comprising or some other alternative language. For example, a reference to a phenyl group comprising a substituent at the 4-position refers to a group having a non-hydrogen atom at the 4-position and hydrogen or any other non-hydrogen group at the 2-, 3-, 5-, and 6-positions.

Each substituted phenyl group can comprise a substituent at the 2-position, a substituent at the 3-position, a substituent at the 4-position, substituents at the 2- and 3-positions, substituents at the 2- and 4-positions, substituents at the 3- and 4-positions, or substituents at the 2-, 3-, and 4-positions. The substituted phenyl group can be a 2-substituted phenyl group, a 3-substituted phenyl group, a 4-substituted phenyl group, or a 5-substituted phenyl group. One or more substituents of a multi-substituted phenyl group can be the same or different; alternatively, all the substituents of a multi-substituted phenyl group can be the same; or alternatively, all the substituents of a multi-substituted phenyl group can be different.

The present disclosure describes organometallic complexes for use as non-aqueous redox flow battery (NRFB) analytes. Generally, the NRFB analytes can be characterized as organic octahedral complexes having two tridentate bis(imino)pyridine ligands ($I_2P$) coordinating to a Group 13 metal. The complexes can access five ligand charge states: $(I_2P^0)(I_2P^-)M]^{2+}$, $[(I_2P^-)_2M]^+$, $(I_2P^-)(I_2P_2{}^-)M$, $[(I_2P_2{}^-)_2M]$, and $[(I_2P_2{}^-)(I_2P_3{}^-)M]^2$. In some embodiments, M is aluminum, and the ligand charge state further includes $[(I_2P_3{}^-)_2M]^{3-}$.

An organometallic complex for use as a NRFB analyte of the present disclosure can be represented by Formula I:

$$L_1—M—L_2$$

or a salt thereof, wherein M is a Group 13 metal and $L_1$ and $L_2$ are molecular redox-active ligands independently selected from bis(imino)pyridine compounds according to Formula II:

(II)

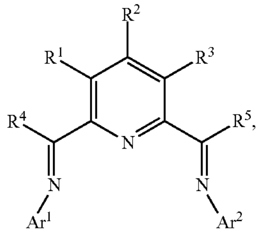

wherein $R^1$, $R^2$, and $R^3$ are independently selected from a hydrogen atom; hydrocarbon groups having one to twenty carbon atoms with optional inclusion of one or more heteroatoms selected from oxygen, nitrogen, silicon, sulfur, and halogen atoms, wherein the hydrocarbon group is attached to the pyridine ring by a carbon atom; halogen atoms; hydroxy groups; nitrile groups; amino groups —$NR^{11}R^{12}$; ether groups —OR; carboxamide groups —C(O)$NR^{11}R^{12}$ or —$NR^{11}$C(O)R; keto groups —C(O)R, carboxylic acid groups —C(O)OH or salt thereof; ester groups —C(O)OR; sulfonate groups; phosphonate groups; silyl groups, and nitrate groups; wherein $R^{11}$ and $R^{12}$ are independently selected from a hydrogen atom and hydrocarbon groups and R is a hydrocarbon group;

$R^4$ and $R^5$ are independently selected from a hydrogen atom; hydrocarbon groups having one to twenty carbon atoms with optional inclusion of one or more heteroatoms selected from oxygen, nitrogen, sulfur, and halogen atoms, wherein the hydrocarbon group is attached to the imine group by a carbon atom; and Ar1 and Ar2 are independently selected from substituted phenyl groups. In one embodiment of Formula II, when $R^1$, $R^2$, and $R^3$ are hydrogen, and $R^4$ and $R^5$ are phenyl groups, $Ar^1$ and $Ar^2$ are not 2-methoxyphenyl groups.

Ligands of formula II can be prepared by methods known in the art, for example, by a condensation reaction between a primary amine and a diketone.

In some embodiments, $Ar^1$ and $Ar^2$ are independently a substituted phenyl group according to Formula III:

(III)

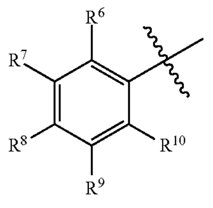

wherein at least one of $R^6$, $R^7$, $R^8$, $R^9$, and $R^{10}$ is selected from hydrocarbon groups (R) having one to twenty carbon atoms with optional inclusion of one or more heteroatoms selected from oxygen, nitrogen, silicon, sulfur, and halogen atoms, wherein the hydrocarbon group is attached to the pyridine ring by a carbon atom; halogen atoms; hydroxy groups; nitrile groups; amino groups —$NR^{11}R^{12}$; ether groups —OR; carboxamide groups —C(O)$NR^{11}R^{12}$ or —$NR^{11}$C(O)R; keto groups —C(O)R, carboxylic acid groups —C(O)OH or salt thereof; ester groups —C(O)OR; sulfonate groups; phosphonate groups; silyl groups, and nitrate groups; wherein $R^{11}$ and $R^{12}$ are independently selected from a hydrogen atom and hydrocarbon groups and R is a hydrocarbon group.

Optionally, $R^1$ and $R^3$ are hydrogen, $R^2$ is Cl—, Br—, alkynyl, phenylethynyl, or TMS-ethynyl, $R^4$ and $R^5$ are phenyl groups, and $Ar^1$ and $Ar^2$ are independently a 2-, 3-, or 4-alkylphenyl group, a 2,3-dialkylphenyl group, a 2,4-dialkylphenyl group, a 3,4-dialkylphenyl group, a 2,3,4-trialkylphenyl group, a perhalophenyl group (e.g., $PhF_5$), 2-, 3-, or 4-polyalkoxy group, a 2-, 3-, or 4-methoxyphenyl group, or a 2-, 3-, or 4-dimethylaminophenyl group.

M can be any Group 13 metal. In some cases, M is Al, Ga, or In. Earth abundant and relatively inexpensive, Al(III) stabilizes the complex and accesses additional redox features particularly advantageous for Redox-Flow Batteries.

Depending on the substituents on the ligands, a salt form of the organometallic complexes above can provide enhanced solubility for NRFB applications as compared with the neutral complex. Where each ligand has a $1^-$ charge, the organometallic complex bears a $1^+$ charge (i.e., a Group 13 metal is $3^+$). Suitable counterions include weakly coordinating anions such as, for example, $AlCl_4^-$, $BPh_4^-$, $BF_4^-$, $PF_6^-$, $AsF_6^-$, $SbF_6^-$, $OTeF_5^-$, $OClO_3^-$, $(CF_3SO_2)_2N^-$ and $CF_3SO_3^-$. The skilled artisan can select the anion based on known or observed solubility with other cations in the desired electrolyte solution for an NRFB configuration. In some cases, the anion is selected based on its effect on analyte diffusion kinetics (D) and electron-transfer rate ($k_0$) with the organometallic complex cation.

In one or more embodiments of the present disclosure, the NRFB analyte is an organometallic salt represented by Formula IV:

(IV)

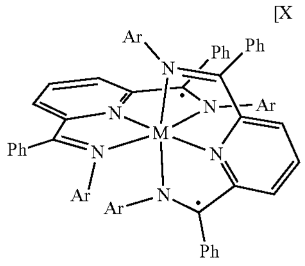

wherein M is a Group 13 metal, Ph is phenyl, Ar is a substituted phenyl group as defined above, and X is a counter-ion that enhances the solubility of the organometallic complex in a desired solvent. For example, an NRFB analyte of the present disclosure can be the organometallic salt 2a or 2b shown in FIG. 2. A NRFB analyte comprising $OTf^-$ as the counter-ion can exhibit significantly improved solubility in acetonitrile electrolyte solution compared to the $PF_6^-$ counter-ion, in addition to fast diffusion kinetics and heterogeneous electron-transfer rate ($k_0$) (see Example).

Embodiments of the present disclosure also include liquid compositions of the NRFB analyte. For example, the liquid composition can include the NRFB analyte dissolved in a non-aqueous solvent, such as acetonitrile (MeCN), gamma-butyrolactone (GBL), a cyclic carbonate (such as propylene carbonate (PC), ethylene carbonate (EC), and butylene carbonate), dimethyl carbonate (DMC), diethyl carbonate (DEC), N-methyl-2-pyrrolidone (NMP), N,N-dimethylformamide (NMF), N,N-dimethylacetamide, dimethylsulfoxide (DMSO), dimethyl sulfone, sulfolane, chlorobenzene, cyclopentanone, tetrahydrofuran (THF), 1,4-dioxane, methanol, ethanol, ethylene glycol, diethylene glycol, triethylene glycol, tetraethylene glycol, their mono or dimethyl ethers, 1,3-dioxolane (1,3DO), 1,2 propylene glycol, 1,3 propylene glycol and mixtures thereof (e.g., solvent mixed with one or more co-solvents). Mixtures can include binary, ternary, and quaternary mixtures. The two or more solvents can be present at any ratio in the mixture. For example, a mixture of a first and second solvent can have a ratio of 0.1-99.9 first solvent:0.1-99.9 second solvent (vol. %). Exemplary binary mixtures include MeCN/PC, MeCN/DMSO, MeCN/EC, MeCN/1,3DO, and MeCN/DMF. A ternary mixture can be 1,3DO/MeCN/DMF, for example, at various ratios of first solvent:second solvent:third solvent. In some cases, the NRFB analyte is in the form of a solid (e.g., a powder or crystal).

One or more NRFB analytes of the present disclosure exhibit relatively high solubility in non-aqueous solvents and mixtures thereof compared with previously reported multi-electron analytes. The NRFB analyte can be included in any suitable concentration in a liquid composition. Typically, the NRFB analyte concentration is at least about 1.0 mM to about 5,000 mM (where "about" includes the recited value+/−20%). In different embodiments, the NRFB analyte is included in the liquid solution in a concentration of 0.8 mM, 1.0 mM, 5 mM, 7.5 mM, 10 mM, 15 mM, 25 mM, 50 mM, 100 mM, 200 mM, 300 mM, 400 mM, 500 mM, 1,000 mM, 2,500 mM, or 5,000 mM or a concentration within a range bounded by any two of the foregoing exemplary values (e.g., about 5 mM to about 25 mM, about 50 mM to about 200 mM, about 250 mM to about 750 mM, about 500 mM to about 1,000 mM, about 800 mM to about 2,000 mM, and about 500 mM to about 5,000 mM). In one or more embodiments, the solubility of an NRFB analyte in a mixture of non-aqueous solvents is greater than the solubility in a single solvent.

One or more NRFB analytes of the present disclosure exhibit high stability in organic solvent. For example, the triflate salt of an organometallic complex according to Formula I may resist degradation for more than two weeks of charging and discharging cycles, and show only partial degradation after three or more weeks of charging/discharging.

Embodiments of the present disclosure include a method of preparing a salt form of a NRFB analyte described above. Using 2,6-Bis{1-[(2-methoxyphenyl)imino]-benzyl}pyridine as an exemplary ligand ($L_1$ and $L_2$), the method includes reducing the ligand, mixing stoichiometric amounts of a Group 13 metal ion and the reduced ligand to form an organometallic complex; and mixing an excess amount of the counter-ion and the organometallic complex to form the organometallic salt. Other species of $L_1$ and $L_2$ defined by Formula II can be used to provide an NRFB analyte salt described above. The reagents can be dissolved in an organic solvent such as tetrahydrofuran (THF), diethylether, or dimethoxyethane (DME) before mixing. The Group 13 metal ion can be provided as a trihalide salt of the metal (i.e., $MCl_3$). The counter-ion can be any of the ions described above (e.g., a triflate ion). The reduction of the ligand can be identified by a first color change. The formation of the organometallic complex can be identified by second color change. The method can further include purifying the organometallic salt. In some cases, purifying includes concentrating the organometallic salt by removing the organic solvent (e.g., using vacuum or distillation), and can further include washing the resulting oily solid (e.g., with benzene), dissolving the washed organometallic salt, filtering the solution, and concentrating the filtered solution to provide a purified organometallic salt powder. The method described above is more efficient than methods requiring preparing a $(L_1^{2-})(L_2)M$ complex in a first step, and oxidizing the complex in a subsequent step.

Figure 1B:
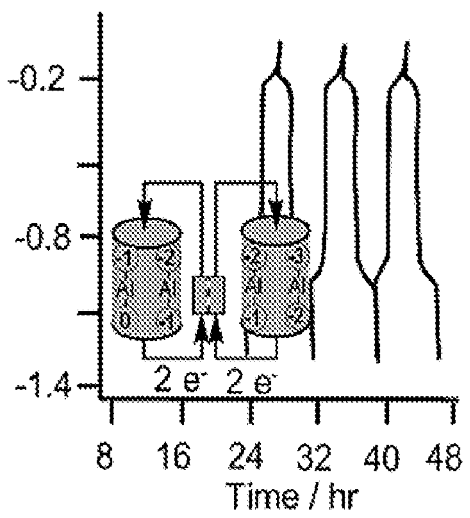
Figure 2:
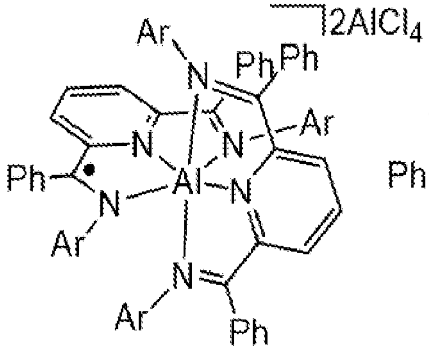
FIG. 2 shows the representative structures for analytes considered in this work (complexes 1, 2a, 2b, and 3), according to one or more embodiments of the present disclosure.
Figure 2:
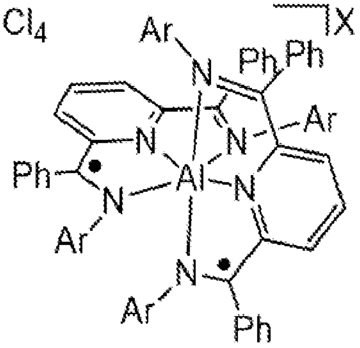
Figure 2:
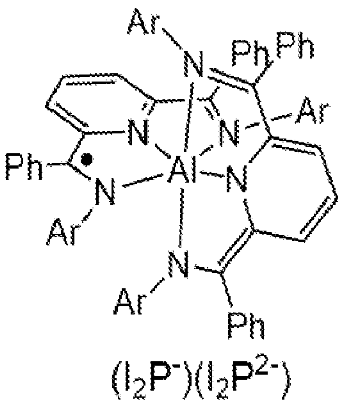

Embodiments of the present disclosure further describe a NRFB including a negative compartment containing a negative electrode disposed within a non-aqueous liquid electrolyte solution; a positive compartment containing a positive electrode disposed within the non-aqueous liquid electrolyte solution; a separator interposed between positive and negative compartments; wherein at least one of the negative compartment or the positive compartment includes the NRFB analyte comprising the organometallic salt represented by formula I above dissolved in a non-aqueous solvent. For example, the NRFB can have a symmetric configuration wherein both the negative and positive compartments include the NRFB analyte dissolved in the non-aqueous solvent and the NRFB analyte is in its neutral state, i.e., at rest, before the charging process or at completion of the discharging process. In some cases, the NRFB analyte is organometallic salt 2a or 2b as shown in FIG. 2. For example, the NRFB can have the analyte and configuration illustrated in FIG. 1A or 1B.

The NRFB analyte can be included in any suitable concentration, typically at least 1.0 mM. In different embodiments, the NRFB analyte is included in the non-aqueous liquid electrolyte solution in a concentration of about 5 mM, 7.5 mM, 10 mM, 12.5 mM, 15 mM, 17.5 mM, 20 mM, 22.5, mM 25 mM, or 50 mM, or a concentration within a range bounded by any two of the foregoing exemplary values (e.g., 5 mM to 15 mM).

Suitable non-aqueous solvents include acetonitrile (MeCN), gamma-butyrolactone (GBL), a cyclic carbonate (such as propylene carbonate (PC), ethylene carbonate (EC), and butylene carbonate), dimethyl carbonate (DMC), diethyl carbonate (DEC), N-methyl-2-pyrrolidone (NMP), N,N-dimethylformamide (DMF), N,N-dimethylacetamide, dimethylsulfoxide (DMSO), dimethyl sulfone, sulfolane, chlorobenzene, cyclopentanone, tetrahydrofuran (THF), 1,4-dioxane, methanol, ethanol, ethylene glycol, diethylene glycol, triethylene glycol, tetraethylene glycol, their mono or di-methyl ethers, 1,3-dioxolane (1,3DO), 1,2 propylene glycol, 1,3 propylene glycol and mixtures thereof. Mixtures can include binary, ternary, and quaternary mixtures and the two or more solvents can be present at any ratio in the mixture. For example, a mixture of a first and second solvent can have a ratio of 0.1-99.9 first solvent:0.1-99.9 second solvent (vol. %). Exemplary binary mixtures include MeCN/PC, MeCN/DMSO, MeCN/EC, MeCN/1,3DO, and MeCN/DMF. A ternary mixture can be 1,3DO/MeCN/DMF, for example, at various ratios of first solvent:second solvent:third solvent.

The positive compartment (i.e., "cathode compartment") contains the liquid electrolyte solution (i.e., "catholyte") in contact with a positive electrode (i.e., "cathode"), wherein the term "positive electrode" does not require that the electrode be in operation to possess a positive polarity, but rather, indicates an electrode suitable in its characteristics (i.e., "when not in operation") for oxidizing the redox active molecule during the charging phase and reducing the redox active molecule during the discharging phase. The negative compartment (i.e., "anode compartment") contains the same liquid electrolyte solution (i.e., "anolyte") in contact with a negative electrode (i.e., "anode"), wherein the term "negative electrode" does not require that the electrode be in operation to possess a negative polarity, but rather, indicates an electrode suitable in its characteristics (i.e., when not in operation) for reducing the redox active molecule during the charging phase and oxidizing the redox active molecule during the discharging phase. The term "positive" and "negative," when modifying an electrolyte solution or compartment, is intended to indicate an electrolyte in contact with the corresponding electrode, and a compartment used for holding the corresponding electrolyte or electrode.

The positive and negative compartments can be constructed of any of the materials known in the art that are non-reactive and suitable for holding non-aqueous (i.e., organic) liquid solutions.

The positive and negative electrodes are independently constructed of any of the electrode materials known in the art. The positive and negative electrodes may independently include or be selected from, for example, graphite (e.g., rods), carbon felt, glassy carbon, reticulated vitreous carbon nickel on carbon, porous nickel sulfide, nickel foam, platinum, palladium, gold, titanium, titanium oxide, ruthenium oxide, iridium oxide, or a composite, such as a carbon-polyolefin composite, or a composite containing polyvinylidene difluoride (PVdF) and activated carbon, or a composite of platinum and titanium, e.g., platinized titanium. In some embodiments, the electrode material may include or be composed of an element selected from C, Si, Ga, In, Al, Ti, V, Cr, Fe, Co, Ni, Cu, Zr, Nb, Ta, Mo, W, Re, Ru, Os, Rh, Ir, Pd, Pt, Ag, Au, alloys thereof, degenerately-doped semiconductors thereof, and oxides thereof. The choice of electrode material may be dependent on the choice of species of organometallic salt of Formula I, solvent, and other aspects of the redox flow battery in particular embodiments. For example, when the NRFB analyte $[(I_2P^-)_2Al][OTf]$ is included in the battery, graphite rods can minimize deposition of the analyte during operation of the battery compared to other electrode materials.

The present disclosure also encompasses half cells of the NRFB above. For example, a half-cell can include a compartment containing an electrode disposed in the non-aqueous liquid electrolyte solution comprising the NRFB analyte dissolved in a non-aqueous solvent. Each compartment and its associated electrode and electrolyte solution define the half-cell.

The separator functions as a barrier to mixing of the first and second electrolyte solutions and/or an electrical insulator to reduce or prevent short circuits between the positive and negative electrodes. The separator can facilitate ion transport between the positive and negative electrolyte chambers, thereby balancing electron transport during charge and discharge cycles. The separator can be selected from any material configured to separate the non-aqueous liquid electrolyte in the positive compartment from the non-aqueous liquid electrolyte in the negative compartment in order to substantially prevent the redox active species in the positive and negative compartments from intermingling with each other, while permitting passage of non-redox-active species between positive and negative electrolyte solutions. Thus, selection of a suitable separator can depend in part on the likelihood that a specific $L_1$ and/or $L_2$ substituent will impede passage of the organometallic complex. The non-redox-active species are those ionic species, as well known in the art, that establish electrical neutrality and complete the circuitry in a battery, and which are included in the electrolyte solution (e.g., supporting electrolyte, as described below) or are formed during the course of the redox reactions in each compartment. In order to permit flow of non-redox-active species, the separator component may be, to some extent, porous. Some examples of inorganic or ceramic compositions for the separator component include alumina, silica (e.g., glass), titania, and zirconia. In some cases, the separator is a fine glass frit. Porous organic polymers that do not separate by ionic charge but rather, size exclusion, may also be used. These can work like physical barriers directing flow geometry to prevent mixing. The separator may operate selectively or non-selectively in its ion permeability. The separator component can have any suitable thickness and hardness. In some embodiments, the separator is in the form of a membrane, such as an anion exchange membrane.

The non-aqueous liquid electrolyte solution can include a supporting electrolyte. The electrolyte solutions may also include one or more supporting electrolytes, which may be organic, inorganic, or a combination thereof. The supporting electrolyte is any salt compound that contains a cationic portion (e.g., alkali, alkaline earth, main group, transition metal, or ammonium species) in combination with an anionic portion (e.g., halide, phosphate, perchlorate, sulfate, carbonate, bicarbonate, nitrate, manganate, vanadate, or carboxylate species). Some examples of alkali metal salts include the lithium halides (e.g., LiF, LiCl, LiBr, LiI), sodium halides (e.g., NaF, NaCl, NaBr, NaI), potassium halides (e.g., KF, KCl, KBr, KI), rubidium halides (e.g., RbF, RbCl, RbBr, RbI), lithium phosphate, lithium hexafluorophosphate, lithium hexafluoroarsenate, lithium perchlorate, sodium perchlorate, and lithium sulfate. Some examples of alkaline earth metal salts include magnesium halides (e.g., $MgF_2$, $MgCl_2$, $MgBr_2$, $MgI_2$), calcium halides (e.g., $CaF_2$, $CaCl_2$, $CaBr_2$, $CaI_2$), strontium halides (e.g., $SrF_2$, $SrCl_2$, $SrBr_2$, $SrI_2$), barium halides (e.g., $BaF_2$, $BaCl_2$, $BaBr_2$, $BaI_2$), and magnesium sulfate. Some examples of ammonium salts include the inorganic ammonium halides (e.g., $NH_4F$, $NH_4Cl$, $NH_4Br$, $NH_4I$), organic ammonium halides (e.g., $MeNH_3Cl$, $Me_2NH_2Cl$, $Me_3NHCl$, $Me_4NCl$, $Et_4NCl$, $Bu_4NF$, $Bu_4NBr$, where Me is methyl, Et is ethyl, and Bu is n-butyl), ammonium perchlorates (e.g., tetrabutylammonium perchlorate, i.e., "TBAP"), and ammonium hydroxides. Generally, the NRFB is operated such that only the NRFB analyte, and not a supporting electrolyte, undergoes a redox reaction.

The supporting electrolyte can be included in any suitable concentration, typically at least 0.01 M. In different embodiments, the supporting electrolyte is included in the electrolyte in a concentration of about 0.01 M, 0.05 M, 0.1 M, 0.2 M, 0.3 M, 0.4 M, 0.5 M, 0.6 M, 0.7 M, 0.8 M, 0.9 M, 1.0 M, 1.1 M, 1.2 M, 1.3 M, 1.4 M, 1.5 M, 2 M, 2.5 M, 3 M, 4 M, 5 M, 6 M, 7 M, 8 M, 9 M, or 10 M, or a concentration within a range bounded by any two of the foregoing exemplary values (e.g., (0.1-1.0 M).

The NRFB can be configured to establish electrical communication between the positive electrode, the negative electrode, and an external load directing electrical energy into or out of the NRFB, and/or to establish flow of the electrolyte solutions past said positive and negative electrodes, respectively.

In some cases, the electrolyte solutions contained in the positive and negative compartments constitute the entire amount of electrolyte solution in the NRFB. Alternatively, the positive and negative compartments are each connected by one or more conduits (e.g., a pipe or a channel) to storage (reservoir) tanks containing additional electrolyte solution, which serve to replenish spent electrolyte solution and increase the electrical capacity of the NRFB and/or promote flow of the electrolyte solutions. The storage tank volume determines the quantity of energy that can be stored in the NRFB, which may be measured in kWh. Flow can be facilitated by one or more pumps. Piping, control, and other equipment suitable for such systems are known in the art.

Embodiments of the present disclosure further describe a method of making a NRFB. For example, making a NRFB can include immersing a negative electrode in a first non-aqueous liquid electrolyte solution, immersing a positive electrode in a second non-aqueous liquid electrolyte solution, and interposing a semi-permeable separator between the negative and positive electrodes, wherein at least one of the first or second non-aqueous liquid electrolyte solutions includes the NRFB analyte comprising the organometallic salt represented by Formula I above dissolved in a non-aqueous solvent.

Embodiments of the present disclosure method of using the NRFB, for example, for electrical energy storage. The method can include charging and discharging the NRFB. For example, the NRFB is discharged by connecting it to an external circuit having an electric load to make a current to flow out, and is charged by connecting it to an external power source to make a current to flow in.

According to one or more embodiments of the present disclosure, a NRFB including the NRFB analyte represented by Formula I above is suited to sustained charge or discharge cycles of several hour durations. For example, in a symmetric NRFB configuration of the present disclosure, in which four electrons can be stored on the organic ligands, charging and discharging cycles remain stable for over 100 cycles at 70% state of charge and 97% Coulombic efficiency. In some instances, the NRFB charging and discharging cycles remain stable over about 500 cycles, 600 cycles, 700 cycles, 800 cycles, 900 cycles or 1000 cycles or more.

Accordingly, embodiments of the present disclosure include energy storage applications where such long charge or discharge durations are desirable. The NRFB can be used to smooth energy supply/demand profiles and provide a mechanism for stabilizing intermittent power generation sources (e.g., solar and wind energy). For example, in non-limiting examples, an NRFB of the present disclosure can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the NRFB of the present disclosure can be used as a power source for remote camps, forward operating bases, off-grid telecommunications, remote sensors, the like, and any combination thereof. The NRFB can provide backup power supplies for a variety of operations, including, for example, telecommunications, hospitals, and other large facilities that require uninterrupted power supplies.

Embodiments of the present disclosure further describe an electrical energy storage system. The system can include one or more NRFB as described above connected to one or more power sources, and configured to store electrical energy from the one or more power sources. In some cases, the NRFB and the power source are connected via an AC/DC converter.

The system may require higher charge or discharge voltages than available from a single NRFB. In such cases, several NRFBs can be connected in series such that the voltage of each cell is additive. An electrically conductive, but non-porous material (e.g., a bipolar plate) may be employed to connect adjacent cells to allow for electron transport without fluid (or gas) transport between adjacent cells. The positive electrode compartments and negative electrode compartments of individual cells can be suitably fluidically connected via common positive and negative fluid manifolds in the stack.

The following Examples are intended to illustrate the above invention and should not be construed as to narrow its scope. Numerous variations and modifications may be made while remaining within the scope of the invention.

EXAMPLES

The following Examples are intended to illustrate the above invention and should not be construed as to narrow its scope. Numerous variations and modifications may be made while remaining within the scope of the invention.

Redox flow batteries (RFB's) operate by storing electrons on soluble molecular anolytes and catholytes, and large increases in the energy density of RFB's could be achieved if multiple electrons could be stored in each molecular analyte. Here, an organoaluminum analyte, $[(I_2P^-)_2Al]^+$, in which four electrons can be stored on organic ligands, is described. In addition, the results show charging and discharging cycles performed in a symmetric nonaqueous RFB configuration remain stable for over 100 cycles at 70% state of charge and 97% Coulombic efficiency ($I_2P$ is a bis(imino) pyridine ligand). The stability of the analyte is promoted by the kinetic inertness of the anolyte to trace water in solvents and by the redox inertness of the Al(III) ion to the applied current. The solubility of the analyte was optimized by exchanging the counter anion for trifluoromethane sulfonate (triflate) and the cell was further optimized using graphite rods as electrodes which, in comparison with glassy carbon and reticulated vitreous carbon, eliminated deposition of analyte on the electrode. Proof-of principle experiments performed with an asymmetric NRFB configuration further demonstrate that up to four electrons can be stored in the cell with no degradation of the analyte over multiple cycles that show 96% Coulombic efficiency.

Introduction

Intermittent renewable energy technologies, such as wind and solar, produce excess amounts of electricity at certain times of day and this has created a need to store on-grid electricity for when it is sought by the end user. A potential solution to storing sizable amounts of electricity is via redox flow batteries (RFBs), which are known for having long lifetimes and very safe operation relative to other common commercial battery options. Commercial deployments of RFB's to date primarily employ the aqueous vanadium ion redox flow battery, which has a maximum cell potential ($V_{cell}$) of 1.25-1.5 V. Use of non-aqueous solvents in RFB's is an alternative option to classical aqueous RFB technology and this would open up the molecular analyte possibilities to include both organic, and metal-containing organic systems.

Non-aqueous RFB's (or NRFB's) offer several potential advantages over traditional aqueous configurations: cell voltage ($V_{cell}$) and solubility of analyte ($C_{active}$), which both in turn enhance overall energy density (E), may significantly increase in non-aqueous solvents (see Calculation 1 below). A wider, accessible operating temperature range is also likely. Steady improvements to $V_{cell}$ and $C_{active}$ over multiple generations of analytes have indeed been realized using NRFB cells and throughout these studies factors such as water-stability, overall cell stability, concentration dependence, analyte crossover, and Coulombic efficiency have also been monitored to understand and maintain overall analyte performance.

A strategy through which energy density could be improved many-fold in a NRFB is development of an analyte molecule that stores multiple electrons while maintaining the above-mentioned characteristics of a desirable and stable flow analyte. Others have explored this concept, and those efforts have led to analytes that store four electrons (TABLE 1), such as $(bpy\text{-}COOMe_2)_3Cr$ complexes, very stable polyoxovanadate clusters, phthalocyanine Mn-nitride (PcMnN), porphyrins ($H_2TPP$), diaminoanthraquinones (DAAQ), functionalized fullerenes, and dodecaborate clusters. The current limitations of these individual systems vary widely and include poor solubility, high cost and low availability for certain metal ions, multi-step synthesis methods, instability, or a combination of these factors.

TABLE 1

Cell parameters for symmetric NRFB tests in which two electrons are stored on each side of the symmetric cell using a previously reported multi-electron analyte.

| Analyte [a] | $V_{cell}$ (V) | $C_{active}$ (mM) | Solvent |
|---|---|---|---|
| POV | 1.7 | 48 | MeCN |
| $[bpy(COOMe)_2]_3Cr$ | 1.8 | 210 | MeCN |
| PcMnN | 2.2 | 1 | MeCN |
| $H_2TPP$ | 2.8 | 10 | $CH_2Cl_2$ |
| (Me-TEG)$_2$DAAQ | 2.7 | 1000 | DME |
| Fullerenes with Fc | 1.7 | 120 | o-DCB [b] |

[a] POV = polyoxoanadate, bpy = 2,2'-bipyridine, Pc — phthalocyanine, TPP = tetraphenylporhyrin, DAAQ = diaminoanthraquinone, Fc = ferrocene.
[b] ortho-dichlorobenzene.

One theoretically very promising approach to increasing the numbers of electrons stored on an anolyte is to employ redox-active ligands bound to a metal center. Previous efforts in this area have provided the proof-of-principle for this approach but have not yielded analytes with stability beyond five cycles in the cases where multiple electrons were successfully stored. The advance presented herein lies in our use of Al(III) as the supporting metal ion which does not enter into the redox chemistry, and thus maintains stability during long periods of charge cycling even when solvents contain trace water (SCHEME 1). Interest in developing water-stable NRFB analytes remains high for ease of handling and because the presence of water lowers flammability. In addition, Al is the most abundant metal in the earth's crust (8%), and its ability to enhance the redox properties of organic analytes adds further interest for large scale application. SCHEME 1. Redox active bis(imino) pyridine ligands are accessible in four charge states. The middle charge states, $I_2P^-$ and $I_2P^{2-}$, form the most stable coordination complexes.

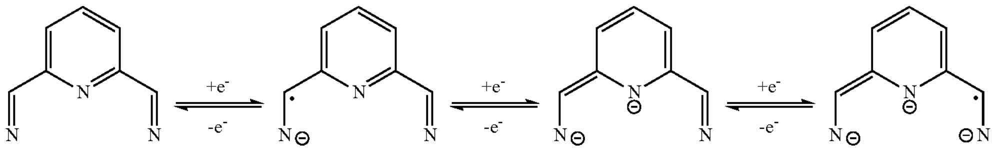

$I_2P$ $I_2P^-$ $I_2P^{2-}$ $I_2P^{3-}$

Results and Discussion

A. Synthesis and Characterization of Compounds

An initial goal of this work was to ensure that the solubility, or accessible $C_{active}$, of the analyte could be high enough to warrant a detailed investigation of redox-active ligand Al complexes in NRFB applications. Organometallic salts with large counter-ions have the greatest potential for accessing high $C_{active}$ in an MeCN electrolyte solution. Therefore bis(imino)pyridine Al(III) complexes with various counter-ions were probed (FIG. 2). Prior work assessed $(I_2P_2^-)(I_2P^-)Al$ (1) (FIG. 2), and a subsequent oxidation step afforded $[(I_2P^-)_2Al][PF_6]$ (2a) (FIG. 2). Synthesis of $[(I_2P^-)(I_2P)Al][AlCl_4]_2$ (3) (FIG. 2) was achieved directly from one $Na(I_2P^-)$ and neutral $I_2P$ and 3 equivalents of $AlCl_3$.

Figure 3:
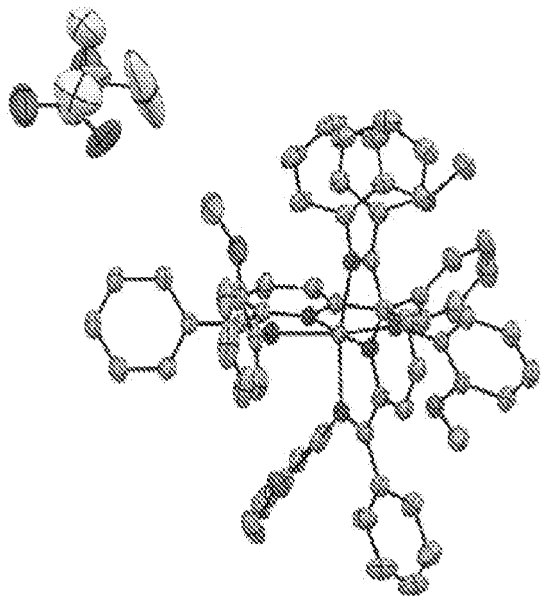
FIG. 3 shows the solid state structure of 2b, an analyte according to one or more embodiments of the present disclosure. Shaded ellipsoids represent C, N, O, Al, S, and F atoms. Solvent molecules and H atoms have been removed for clarity. Ellipsoids shown at 50%.
Figure 4A:
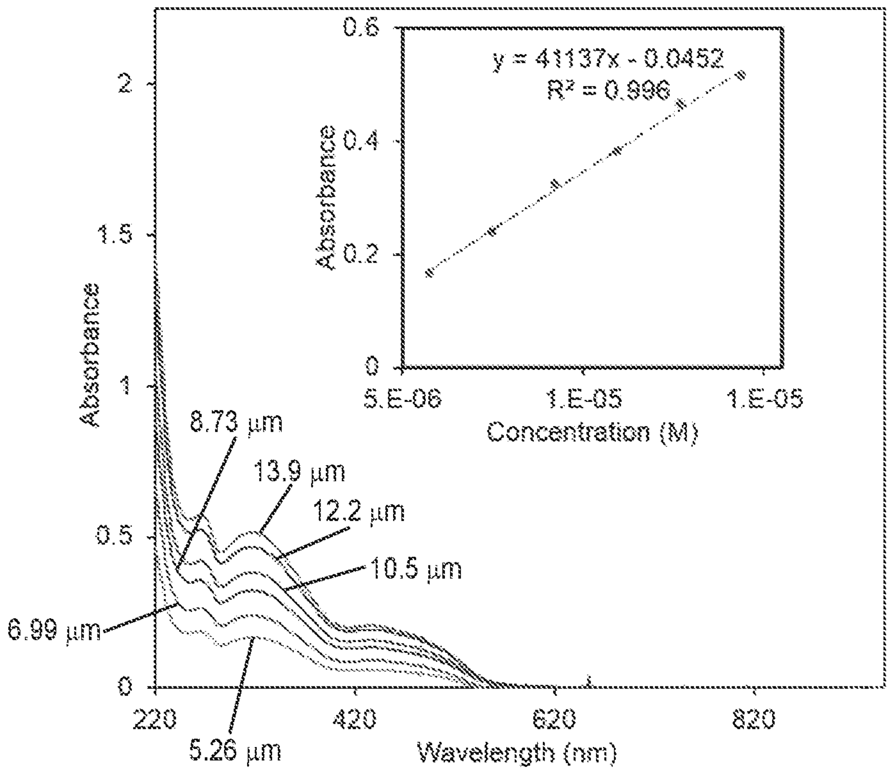
FIGS. 4A-D are UV-Vis spectra of analytes, according to one or more embodiments of the present disclosure. (A) 1; (B) 2a, (C) 2b; and (D). 3 at various concentrations (MeCN, 25° C.). Insets show the respective calibration curve of absorbance at 318, 347, 347 and 355 nm as a function of concentration in MeCN at 25° C.
Figure 4B:
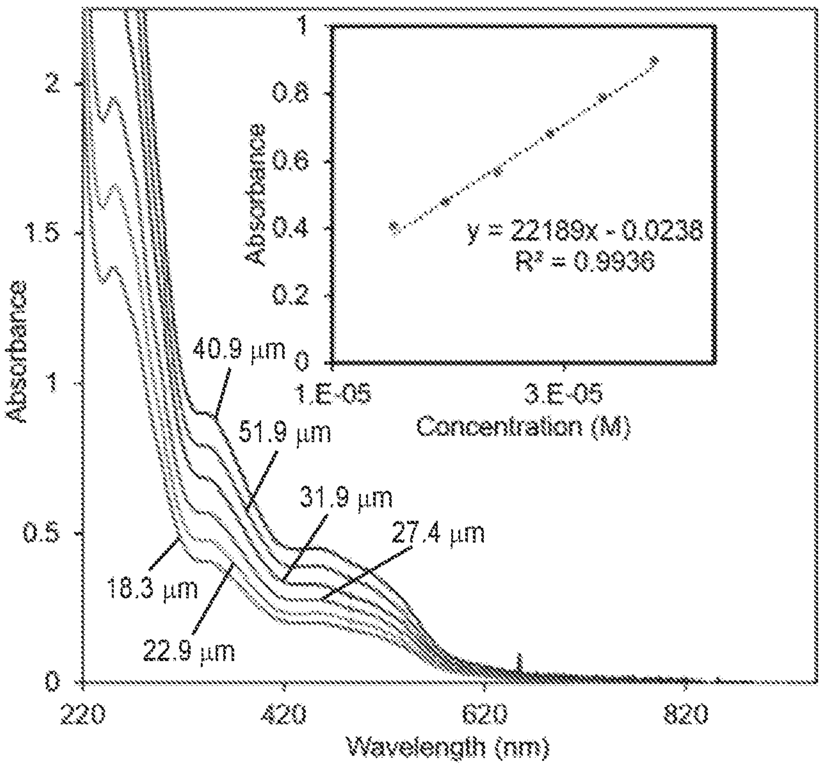
Figure 4C:
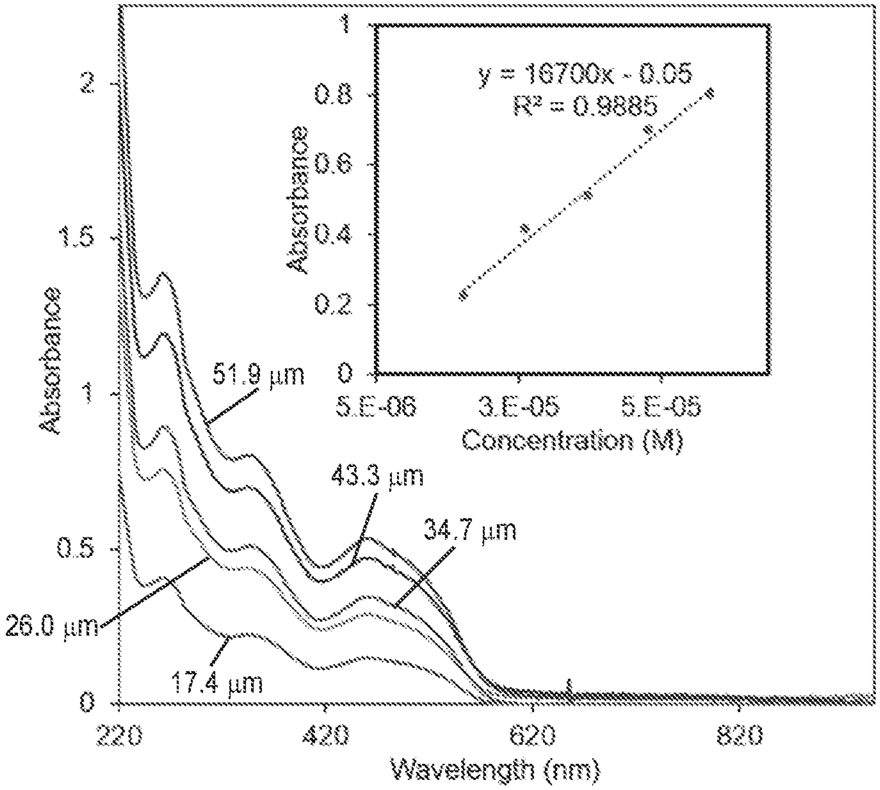
Figure 4D:
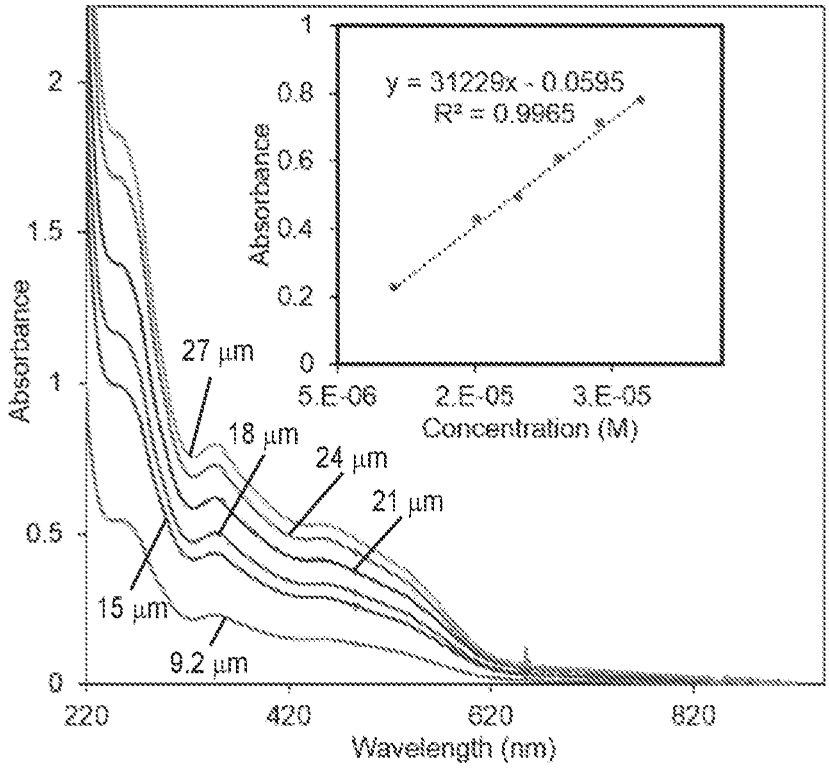

For NRFB applications, a higher yielding route to soluble forms of these compounds is needed. One strategy is seeking a high-yielding, one-step preparation of $[(I_2P^-)_2Al][OTf]$ (2b) since it is known that trifluoromethansulfonate (OTf) salts have appreciable solubility in MeCN. Two equivalents of the $I_2P$ ligand were reduced with two equivalents of sodium metal over 16 h to yield a solution green in color. One equivalent of $AlCl_3$ dissolved in THF was added to this green solution, and 1.1 equivalents of NaOTf were added to the resulting red solution which upon workup provided $[(I_2P^-)_2Al][OTf]$(2b) in 73% yield, $\mu_{eff}$=2.3 μB. Single crystals suitable for X-ray diffraction were obtained overnight from a concentrated solution of 2b in benzene at room temperature (FIG. 3). Full experimental details are provided below. Crystal refinement details, bond lengths and angles are presented in TABLES 2 and 3).

TABLE 2

Crystallographic data[a] for $[(I_2P^-)_2Al][OTf]$ (2b).

| | 2b |
|---|---|
| Formula | $C_{66}H_{54}AlF_3N_6O_7S \cdot 2.5C_6H_6$ |
| Crystal size ($mm^3$) | 0.583 × 0.321 × 0.126 |
| Formula wt, g $mol^{-1}$ | 1366.47 |
| Space group | P $\bar{1}$ |
| a, Å | 17.9238(5) |
| b, Å | 18.2762(6) |
| c, Å | 25.2916(8) |
| α, deg | 92.1328(18) |
| β, deg | 102.0076(17) |
| γ, deg | 115.9687(18) |
| V, $Å^3$ | 7207.5(4) |

TABLE 2-continued

Crystallographic data[a] for $[(I_2P^-)_2Al][OTf]$ (2b).

| | 2b |
|---|---|
| Z | 4 |
| T, K | 100(2) |
| ρ, calcd. $gcm^{-3}$ | 1.259 |
| Refl. collected/2 $\theta_{max}$ | 48405/137.93 |
| Unique refl./I > 2σ(I) | 26358/21155 |
| No. parameters/restraints | 1930/133 |
| λ, Å/μ (Kα), $cm^{-1}$ | 1.54178 |
| $R_1$/GOF | 0.0766/1.047 |

TABLE 2-continued

Crystallographic data[a] for $[(I_2P^-)_2Al][OTf]$ (2b).

| | 2b |
|---|---|
| $wR_2$ (I > 2σ(I)) | 0.1818 |
| Residual density, $eÅ^{-3}$ | 0.679/−0.467 |

[a]Obtained with graphite-monochromated Cu Kα (λ = 1.54178 Å) radiation.
[b]$R_1 = \Sigma||Fo| - Fc||/\Sigma|Fo|$, $wR_2 = \{\Sigma[w(Fo^2 - Fc^2)^2]/\Sigma[w(Fo^2)^2]\}^{1/2}$.

Chart 1: Numbering Scheme for 2b for Table 3.

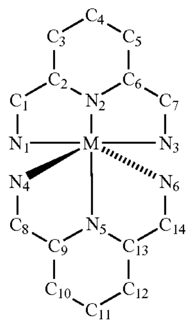

TABLE 3

Selected average interatomic distances (Å) and selected average angles (deg) for the complexes in $[(I_2P^-)_2Al][OTf]$ (2b).

| | 2b | 2b' |
|---|---|---|
| Al—$N_1$ | 2.056(3) | 2.065(3) |
| Al—$N_2$ | 1.890(2) | 1.894(2) |
| Al—$N_3$ | 2.076(3) | 2.024(3) |
| Al—$N_4$ | 2.059(2) | 2.022(3) |
| Al—$N_5$ | 1.891(2) | 1.900(3) |
| Al—$N_6$ | 2.048(2) | 2.070(4) |
| $N_1$—$C_1$ | 1.329(4) | 1.308(4) |
| $N_3$—$C_7$ | 1.314(4) | 1.335(3) |
| $N_4$—$C_8$ | 1.316(4) | 1.331(4) |
| $N_6$—$C_{14}$ | 1.317(3) | 1.308(4) |
| $C_1$—$C_2$ | 1.439(5) | 1.453(4) |

TABLE 3-continued

Selected average interatomic distances (Å) and selected average angles (deg) for the complexes in $[(I_2P^-)_2Al][OTf]$ (2b).

| | 2b | 2b' |
|---|---|---|
| $C_7$—$C_6$ | 1.457(5) | 1.452(5) |
| $C_8$—$C_9$ | 1.443(4) | 1.443(5) |
| $C_{14}$—$C_{13}$ | 1.443(4) | 1.466(5) |
| $N_1$—Al—$N_3$ | 157.7(1) | 158.2(1) |
| $N_4$—Al—$N_6$ | 157.7(1) | 158.1(1) |
| $N_2$—Al—$N_5$ | 177.0(1) | 175.7(1) |

UV-Vis studies of saturated solutions were used to determine the solubility of each complex 1, 2a, 2b, and 3 (TABLE 4, FIGS. 4A-D). This study revealed that uncharged 1 had the lowest solubility at 19.8 mM, and that the organometallic salts, 2a, 2b, and 3 had maximum $C_{active}$ measured at 97, 257, and 450-550 mM, respectively. Unfortunately, the stability of complex 3 in acetonitrile was limited and so extended electrochemical experiments were not performed with 3. The solubility of 2b at almost 260 mM is comparable with the most soluble metal coordination complexes that have been previously reported in NRFB applications.

TABLE 4

Solubility of potential NRFB analytes in MeCN.

| | Complex | $C_{active}$ (mM) |
|---|---|---|
| 2a | $[(I_2P^-)_2Al]PF_6$ | 96.7 ± 2.1 |
| 2b | $[(I_2P^-)_2Al]OTf$ | 257 ± 7 |
| 1 | $(I_2P^{2-})(I_2P^-)Al$ | 19.8 ± 1.1 |
| 3 | $[(I_2P^-)(I_2P^0)Al][AlCl_4]_2$ | 450-550 [a] |

[a] Exact solubility could not be determined due to decomposition of MeCN over 24 h.

B. Electrochemical Measurements

Figure 5:
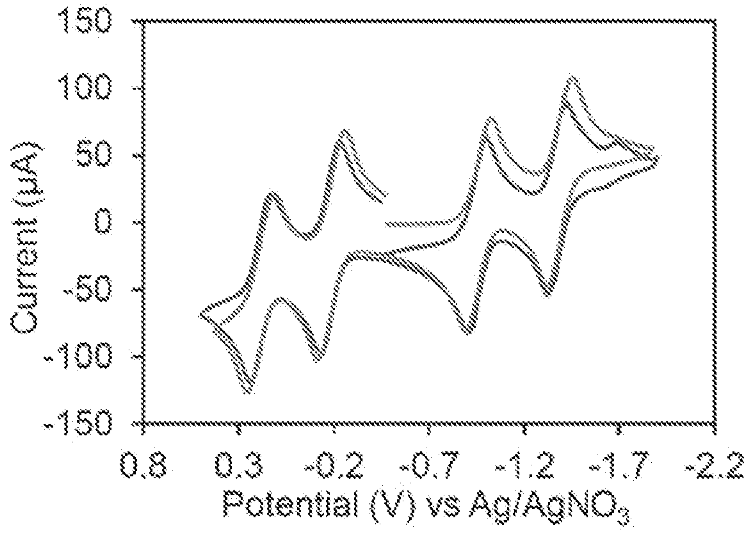
FIG. 5 shows CV's of complex 7.5 mM 2b in 0.5 M $Bu_4NBF_4MeCN$ using a glassy carbon (GC) working electrode and Pt wire counter electrode: solution in working electrode compartment before and after charging/discharging of the complex over 73 h. New reduction feature at −1.7 V (after charging/discharging) is uncoordinated $I_2P$ ligand.

Cyclic voltammetry (CV) measurements were performed in 0.5 M $Bu_4NBF_4$MeCN, and four oxidation and reduction events were observed for 2b (FIG. 5, red). These redox events correspond to the $2b^+/2b$ couple at +0.08 V, the $2b/2b^-$ couple at −0.20 V, the $2b^-/2b^{2-}$ couple at −0.90 V, and the $2b^{2-}/2b^{3-}$ couple at −1.38 V vs SCE.

Figure 6A:
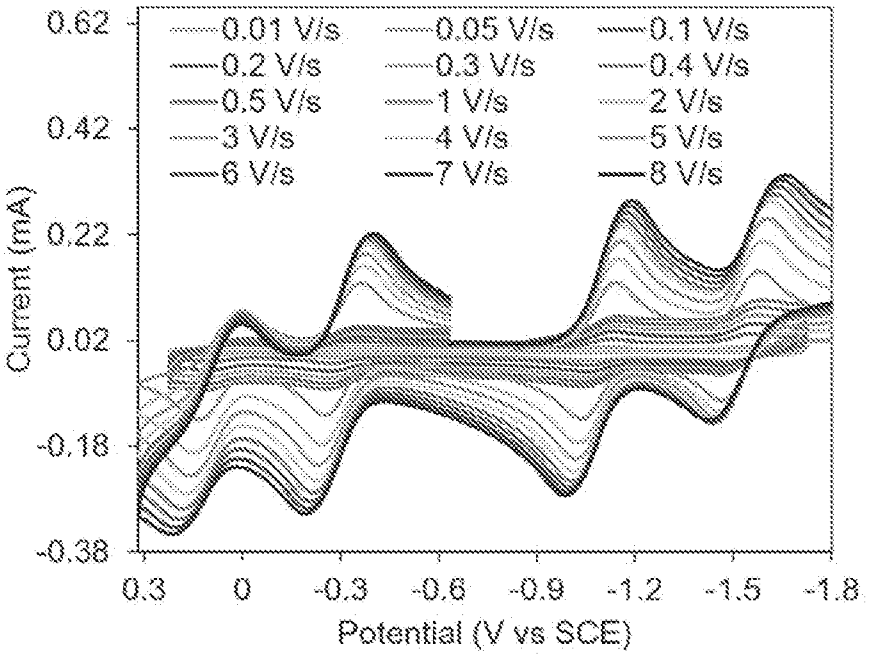
FIGS. 6A-C show electrochemical measurements of an analyte according to one or more embodiments of the present disclosure. (A) shows cyclic voltammetry data to test the reversibility of redox couples of 2b (1 mM); (B) plots of current density ($j_p$) vs the square root of the scan rate ($\upsilon^{1/2}$) were extracted from the linear portion of the data 0.01-0.5 V/s; and (C) plots of the inverse of the square root of scan rate ($\upsilon^{1/2}$) versus the transfer parameter ($\psi$), extracted from the peak to peak separation ($\Delta E_p$) between each redox couple at varying scan rates, according to equation 2 (see Example).
Figure 6C:
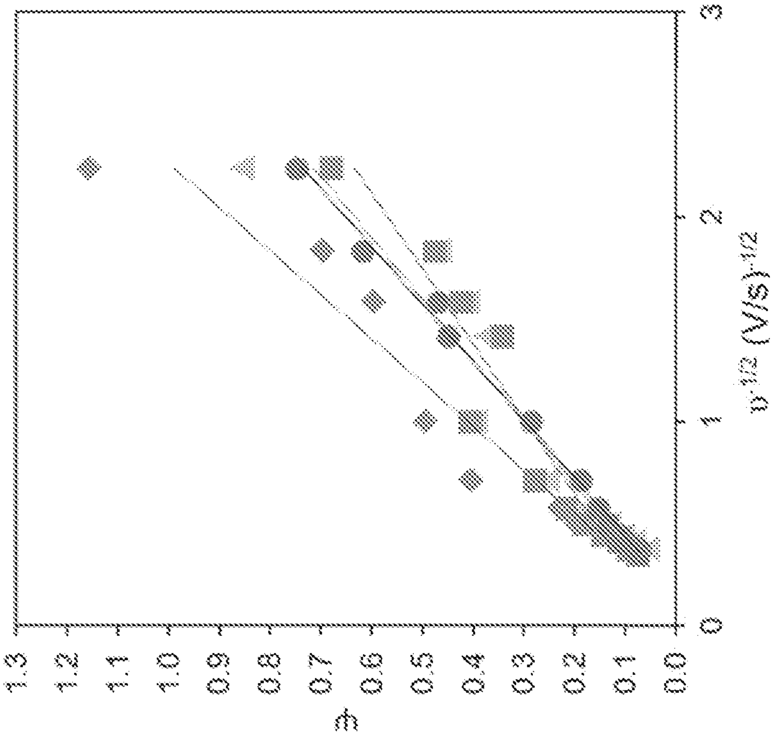
Figure 6B:
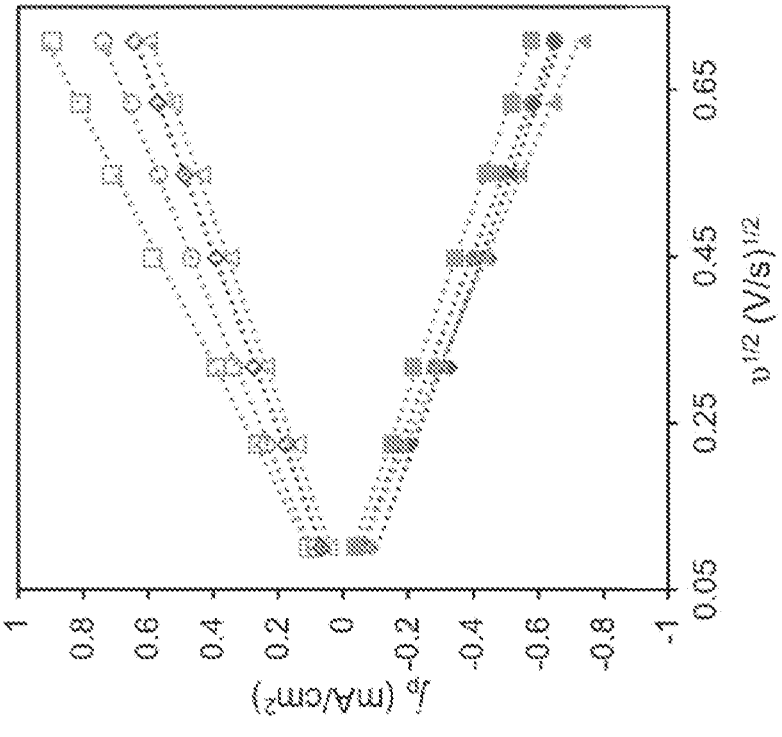
Figure 7B:
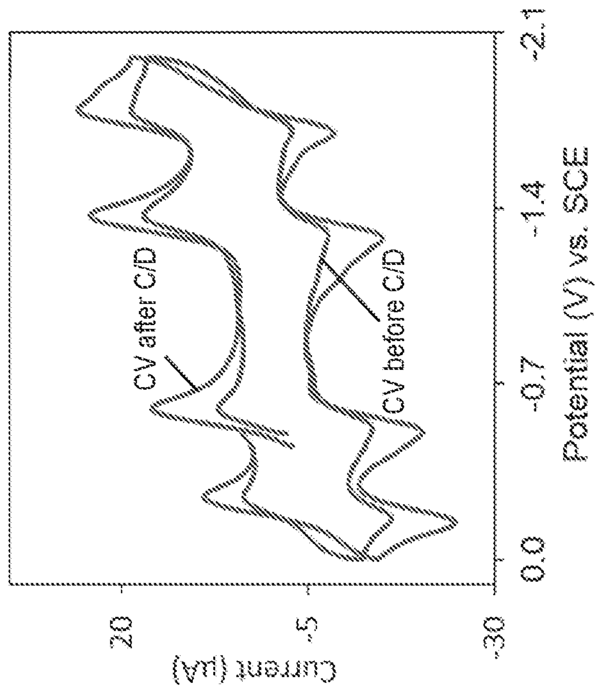
FIGS. 7A-F show CV's of analyte solution in working side compartment before and after extended cycling (charging/discharging or C/D) experiments using various electrodes for both the working and counter electrode. (A) glassy carbon (GC) plate electrode, CV obtained in the H-cell using the electrode used in C/D as the working and counter electrode before and after C/D; (B) GC plate electrode, CV's obtained using a fresh GC button electrode before and after C/D; (C) 100 PPI reticulated vitreous carbon, CV obtained in the H-cell using the electrode used in C/D as the working and counter electrode before and after C/D; (D) 100 PPI reticulated vitreous carbon, CV's obtained using a fresh GC button electrode before and after C/D; (E) graphite electrode, CV obtained in the H-cell using the electrode used in C/D as the working and counter electrode before and after C/D; and (F) graphite electrode, CV's obtained using a fresh GC button electrode before and after C/D.
Figure 7A:
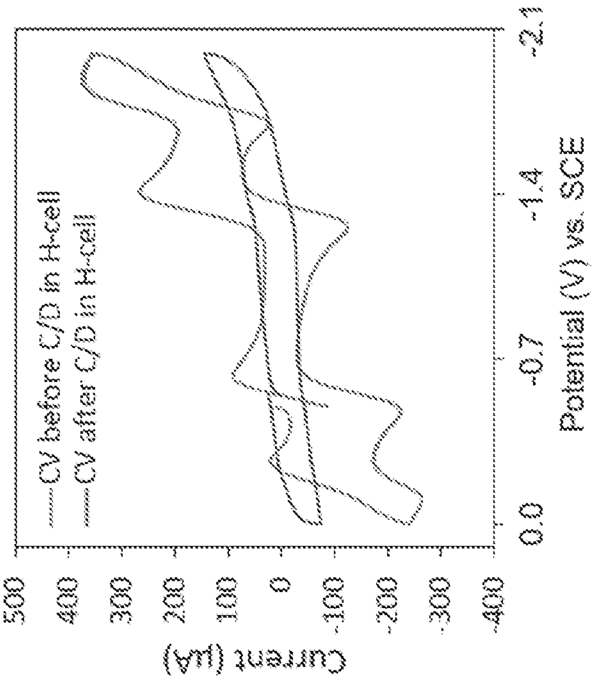
Figure 7C:
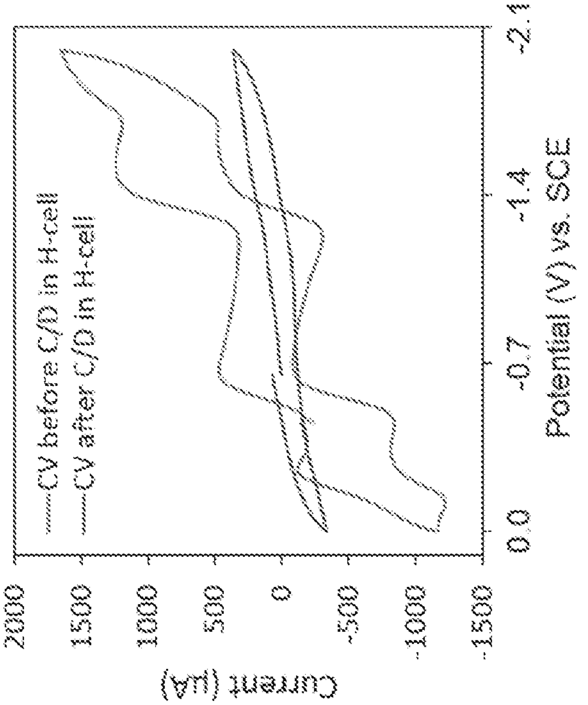
Figure 7D:
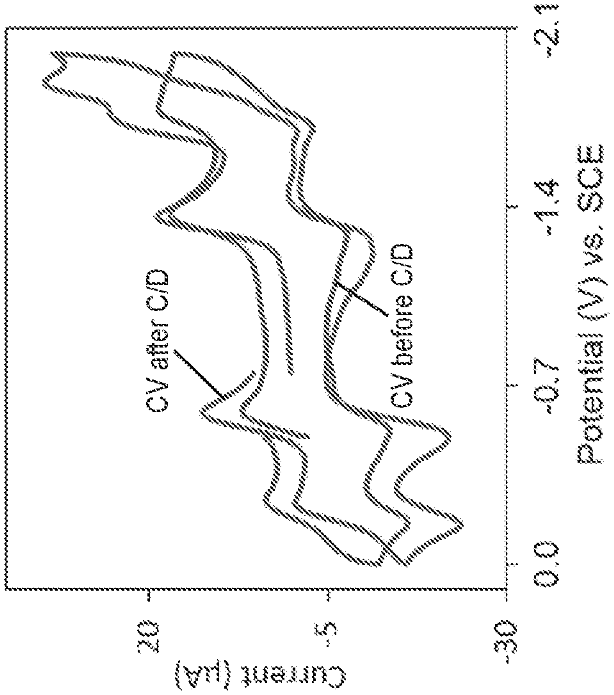
Figure 7E:
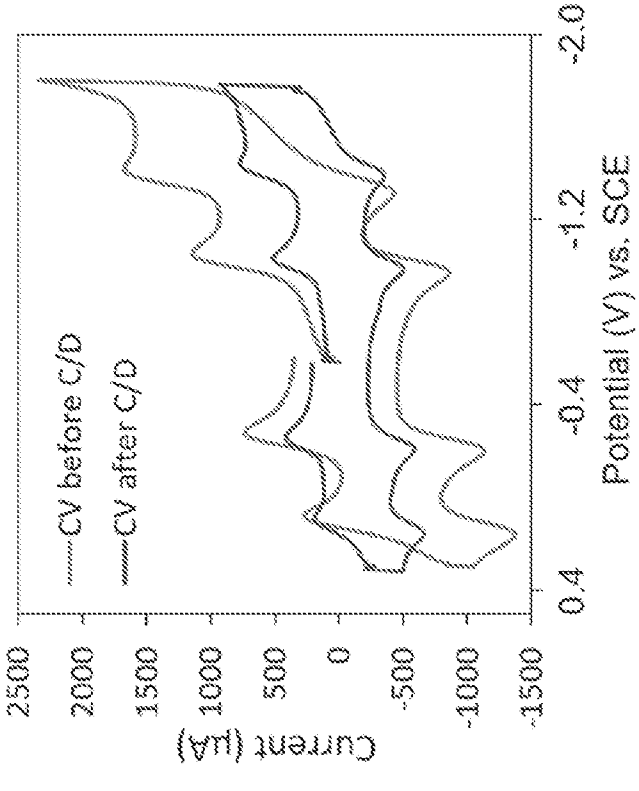
Figure 7F:
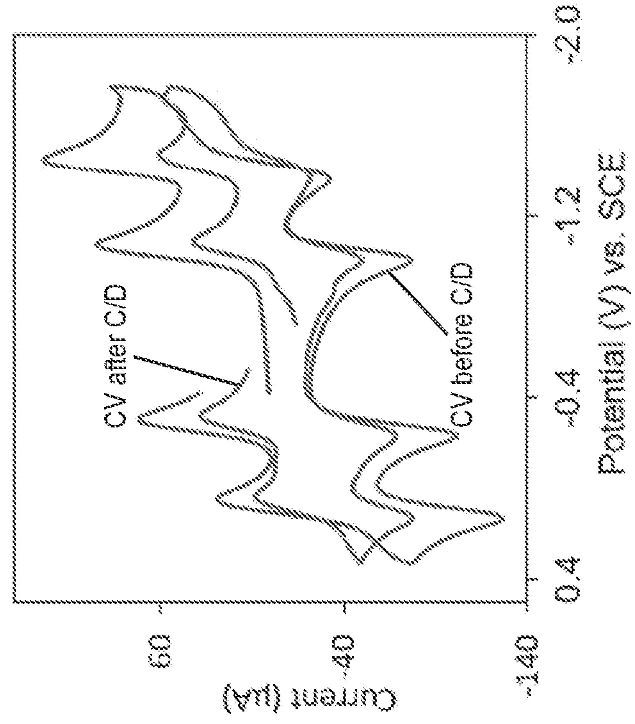

The mass transport and electrokinetics of 2b were also evaluated because a RFB analyte must have fast diffusion kinetics (D) and heterogeneous electron-transfer rate ($k_0$) to have a high rate capability. Roughly, $k_0$ of $10^{-5}$ cm/s is considered a minimum requirement, and this minimum requirement is met by most of the recently studied NRFB analytes. The rate is also dependent on the electrode material, and is generally orders of magnitude higher when using Hg, Pt, or Au electrodes. For this reason, kinetic parameters were probed using a glass carbon (GC) button electrode. CV's were recorded of 2b at varying scan rates, and the D values were determined by plotting the current density versus the square root of the scan rate (FIGS. 6A-C). From the slope of the linear fit of this line and the Randles-Sevcik equation (see equations below), D for each redox couple was obtained (eq. 2). Plots of the inverse of the square root of the scan rate versus the transfer parameter (ψ), extracted from the peak to peak separation ($\Delta E_p$), were also constructed, so that $k_0$ could be calculated using the Nicholson method (TABLE 5, eq 3-4). For each redox couple D is on the order of $10^{-6}$ $cm^2/s$, and $k_0$ is on the order of $10^{-3}$ cm/s (TABLE 5).

TABLE 5

Electrochemical parameters for 2b.

| | $E_{1/2}$ (V vs SCE) | $D_0$ ($10^{-6}$ $cm^2/s$) [a] | $k_0$ (cm/s) [b] |
|---|---|---|---|
| $2b^{2+/1+}$ | 0.06 | 4.7 (6.8) | $8.1 \pm 1.7 \times 10^{-3}$ |
| $2b^{1+/0}$ | −0.30 | 5.1 (4.9) | $8.9 \pm 1.2 \times 10^{-3}$ |
| $2b^{0/1-}$ | −1.08 | 6.3 (5.5) | $13 \pm 2.7 \times 10^{-3}$ |
| $2b^{1-/2-}$ | −1.51 | 9.9 (4.6) | $10 \pm 2.1 \times 10^{-3}$ |

[a] Calculated using eq 2.
[b] Calculated using eq 4.

Figure 8:
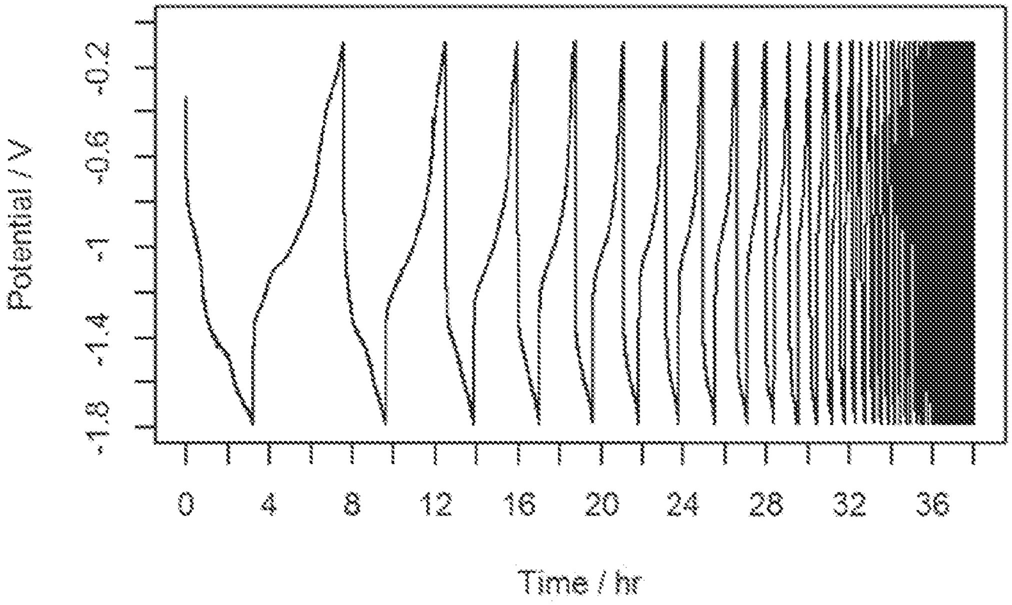
FIG. 8 shows the results of an extended cycling experiment using carbon felt as the working and counter electrode, according to one or more embodiments of the present disclosure. No clear features/plateaus were observed.
Figure 9C:
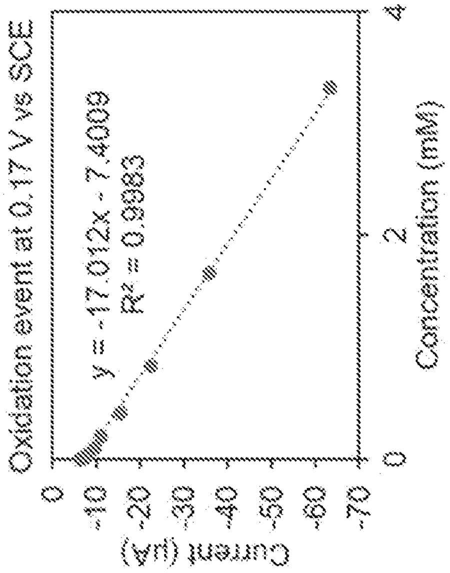
FIGS. 9A-C show electrochemical measurements of an analyte according to one or more embodiments of the present disclosure. (A) CV's of 2b at varied concentrations in 0.5 M $nBu_4NBF_4MeCN$. Glassy carbon working electrode, Pt wire counter electrode, $Ag/AgNO_3$ reference electrode; (B) calibration curve of concentration vs current for the reduction event at −0.29 V; and (C) oxidation event at 0.17 V vs SCE were used to perform crossover studies.
Figure 9B:
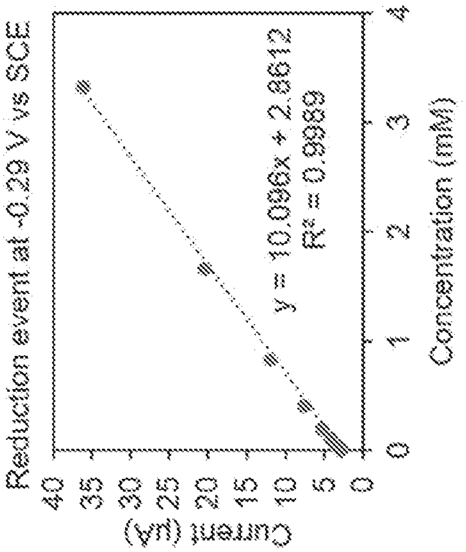
Figure 9A:
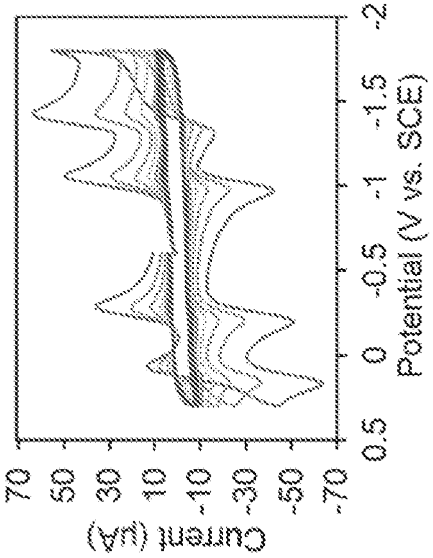

Potential working electrodes for the NRFB cell tests were also screened. GC, reticulated vitreous carbon (RVC, 20, 80 and 100 PPI), graphite rods, and carbon felt which are all commonly employed as working electrodes in NRFB applications were examined. With GC, deposition on electrode surface was observed over 100 cycles: 2b which remained in solution was stable to extended cycling in solution (FIGS. 7A-F. Deposition was also observed using RVC electrodes. With carbon felt electrodes, a clear decrease in the prominence of the charging and discharging plateaus over time occurred which suggests a decrease in the electrochemical stability of the analyte over time (FIG. 8). Graphite rod electrodes gave good cycling performance and no significant deposition over 100 cycles were used for subsequent studies.

Analyte crossover between the two sides of an RFB configured as an asymmetric cell enables cell discharge and so it also needs to be characterized. Crossover studies performed over seven days, and monitored using CV showed that an anion exchange membrane (AEM, Membrane International Inc. AMI-7001S) was effective at preventing crossover of the analyte: less than 10% crossover was observed over seven days (FIGS. 9A-C and 10). Using a glass fine frit separator, 26% crossover of the analyte was observed after 21 h in charging and discharging studies (vide infra).

C. Charging and Discharging Experiments

Having established that 2b meets required solubility, diffusion and electrokinetic behavior, longer time-scale experiments were probed. A redox flow battery can be configured as either "symmetric" or "asymmetric" with both configurations benefiting from an increase in accessible charge states (n) of the redox-active analyte. Asymmetric RFB's have different catholyte and anolyte solutions, separated by a membrane that prevents cell discharge while symmetric RFB's are those in which both sides of the electrochemical cell contain identical electrolyte solution composition when discharged. Both symmetric and asymmetric configurations offer their own potential advantages, for example, an asymmetric configuration will have twice the energy density of a symmetric cell with the same analyte because it can harness all the redox events for each charge/discharge (C/D) cycle. A symmetric cell, on the other hand, benefits from harmless analyte crossover so that analyte decomposition and cell discharge are minimized. Simulations of ideal symmetric and asymmetric RFB's have shown that upon achieving a theoretical 20% crossover, asymmetric RFB's are predicted to decrease in capacity to 80% of their original capacity, whereas symmetric RFB's remain steady at 99% over 1000 cycles. A further benefit of harmless analyte crossover is that anion-exchange membranes are not needed and a simple fine glass frit can be employed.

Figure 12A:
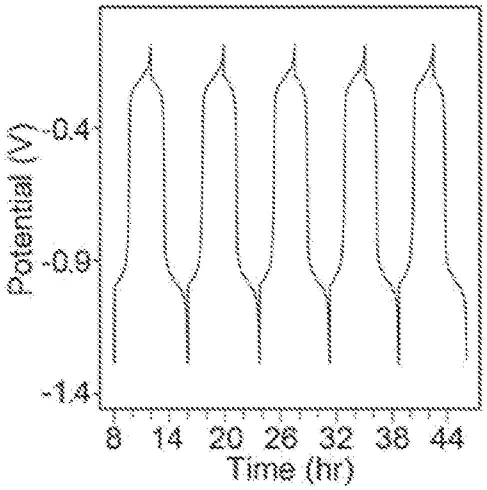
FIGS. 12A-B show experiments performed with fine frit separator and 2b over 100 cycles and 450 h. (A) Potential response during the period 8-46 hours (full experiment FIG. 13); (B) Coulombic efficiency per cycle over 450 h.
Figure 12B:
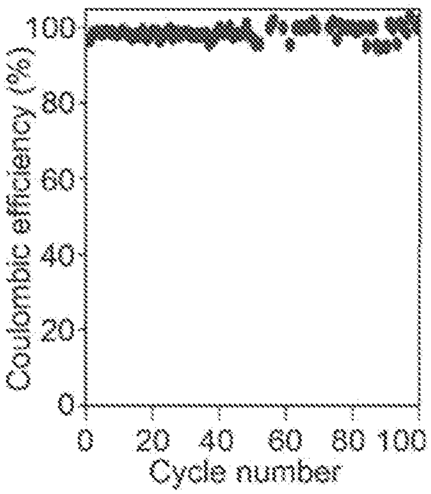
Figure 13:
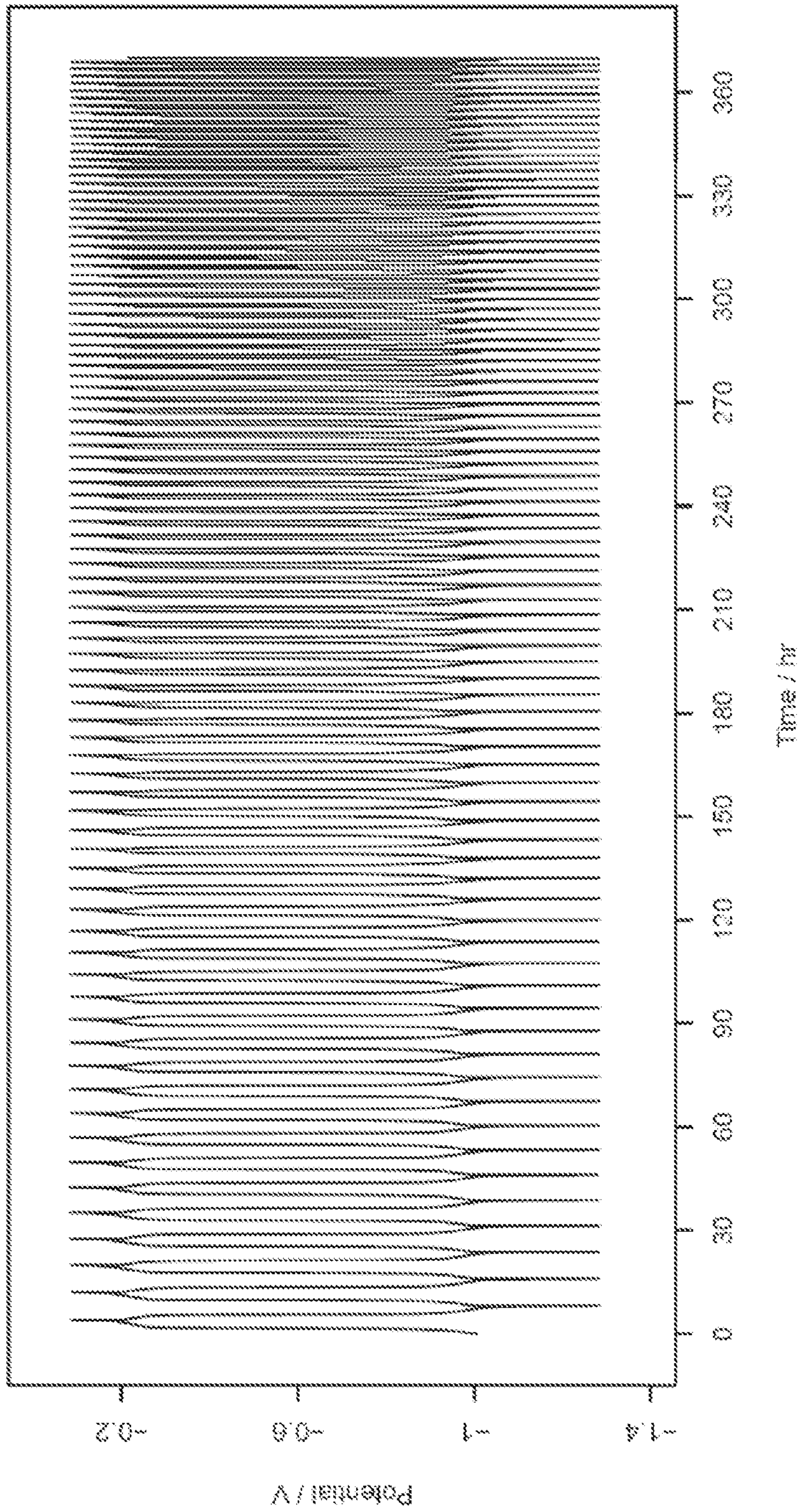
FIG. 13 show extended cycling of 2b using a fine glass frit separator in a symmetric modified H-cell, with 0.2 mA charging and discharging currents.

Complex 2b was tested in both symmetric and asymmetric NRFB configurations and in both cases, an anion exchange membrane (AEM), and a glass frit as separator between the working electrode and counter electrode compartments were trialed. The symmetric NRFB using a glass frit separator was determined to be the most stable cell design and minimized analyte decomposition due to crossover, as shown when it is probed over 100 cycles at a 70% state of charge (Calculation 4, FIGS. 5, 11A-B, and 12A-B). A current of 0.2 mA for the charge and 0.2 mA for the discharge were chosen as described below. Two consecutive plateaus are observed for each charging and discharging process, indicative of two electron transfer processes (FIGS. 12A-B and 13).

Figure 14:
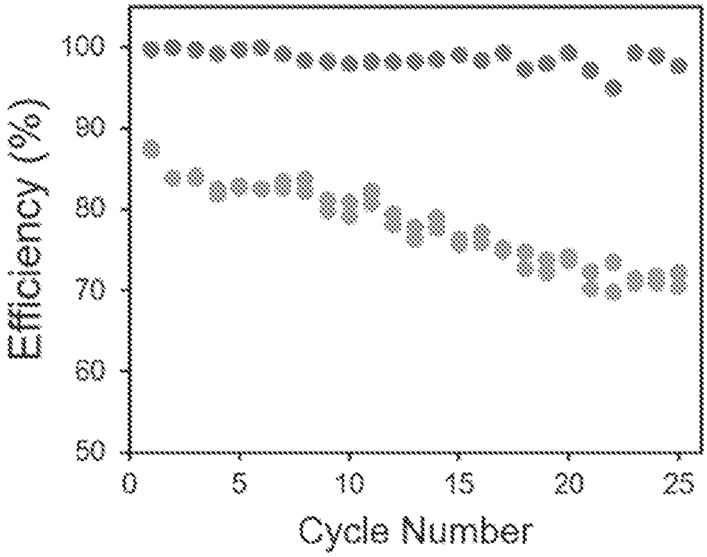
FIG. 14 shows Voltaic (mid), coulombic (uppermost) and overall (lowest) energy efficiency over the first 25 C/D cycles of 2b in an exemplary symmetric H-cell separated by a fine glass frit.

The first plateau at −0.97 V is determined by the oxidation of $2b^-$ to 2b in the cathodic compartment, and the concurrent reduction of $2b^-$ to $2b^{2-}$ in the anodic compartment. The second plateau at −0.21 V is determined by the oxidation of 2b to $2b^+$ in the cathodic compartment, with concurrent reduction of $2b^{2-}$ to $2b^{3-}$ in the anodic compartment. Upon discharge, the reduction of $2b^+$ to 2b and 2b to $2b^-$ in the cathodic compartment results in a small potential drop, with discharging plateaus of −0.98 and −0.24 V, respectively. A Coulombic efficiency of over 97% was achieved and the overall energy efficiency of the system, where the plateaus were well defined over 25 cycles, showed a steady decline from 90 to 70% which tracks with the overall voltaic efficiency decline (FIGS. 12A-B and 14). Partial degradation of analyte was ultimately observed after three weeks of charging/discharging.

Figure 15A:
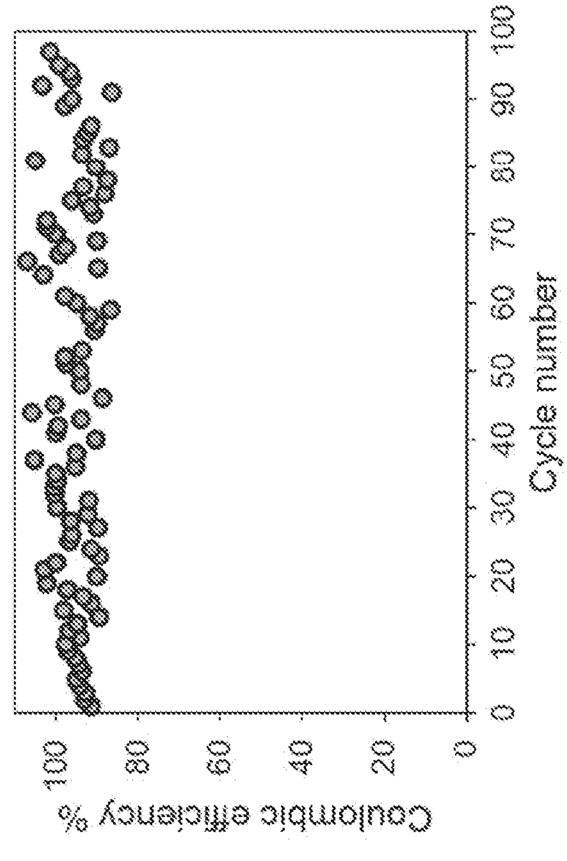
FIGS. 15A-B show charging and discharging experiments with an exemplary symmetric NRFB system. (A) Coulombic efficiency of 100 C/D cycles using an anion-exchange membrane separator; and (B) CV's of working and counter compartments after 100 charging and discharging cycles using an anion exchange membrane.
Figure 15B:
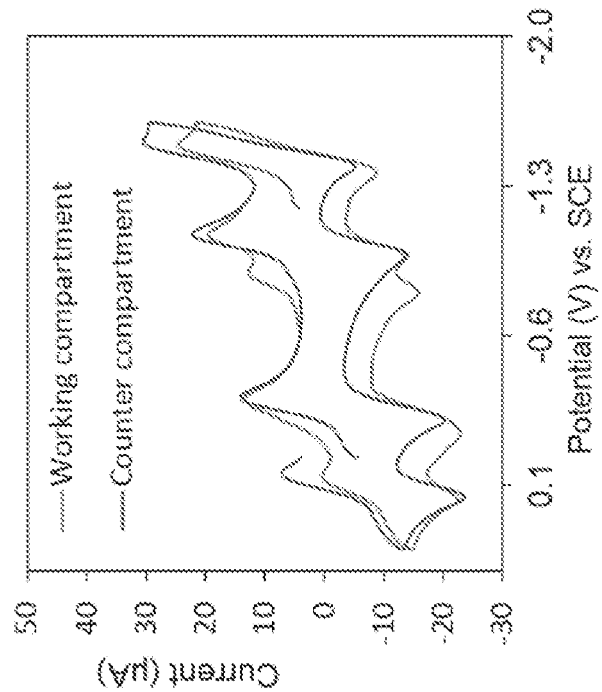
Figure 16:
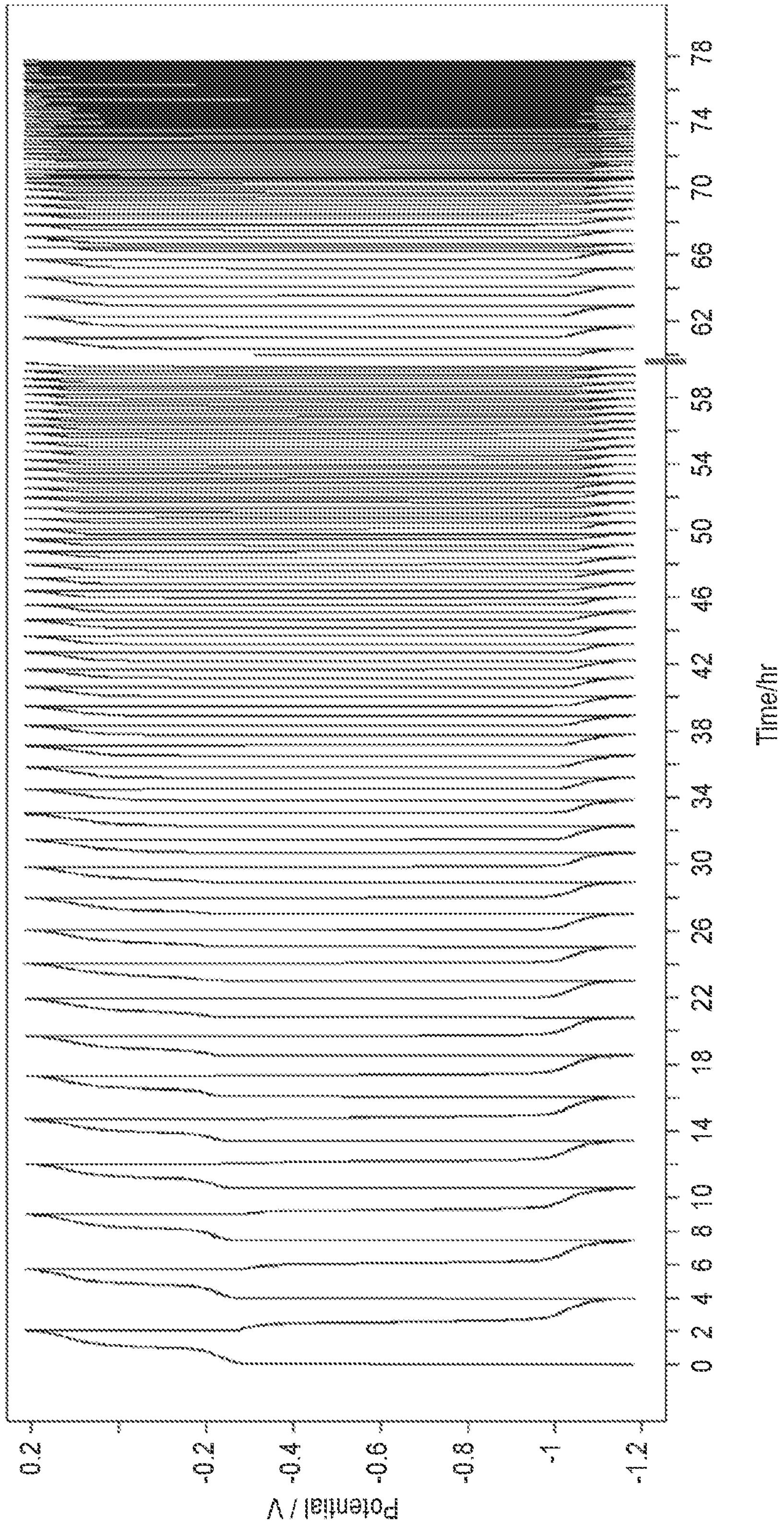
FIG. 16 shows 100 galvanostatic charging and discharging cycles using an anion-exchange membrane in an exemplary symmetric modified H-cell. Hatch line on X-axis designates a pause in the experiment; here, CV's were taken to check the stability of the analyte.

A symmetric NRFB system using an AEM as separator also had a Coulombic efficiency of 97% (FIGS. 15A-B). However, there was a marked decrease in the voltaic efficiency, as evidenced by 0.8 V and 0.52 V voltaic drops between charging and discharging plateaus (FIG. 16). This suggests that some overpotential was needed to fully charge the battery during cycles, which implies a likely incompatibility with the AEM as has been observed by others.

Figure 17A:
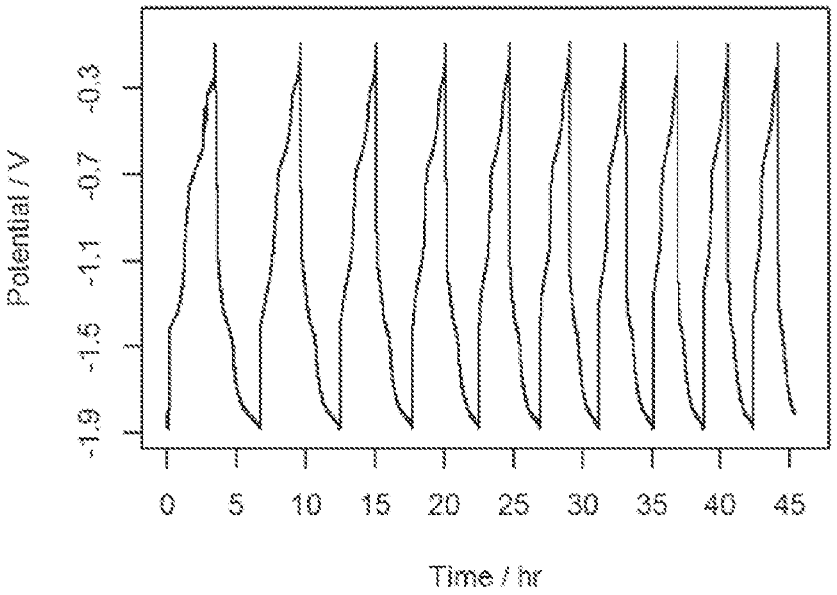
FIGS. 17A-C show charging and discharging experiments using 2b as an NRFB analyte in an asymmetric cell configuration and GC button electrode, according to one or more embodiments of the present disclosure. (A) shows cycling using 2b as an anolyte for an asymmetric battery cell using an anion-exchange membrane separator; (B) shows CV's of working compartment of asymmetric H-cell battery, after 10 cycles; and (C) shows Coulombic efficiency of each cycle.
Figure 17B:
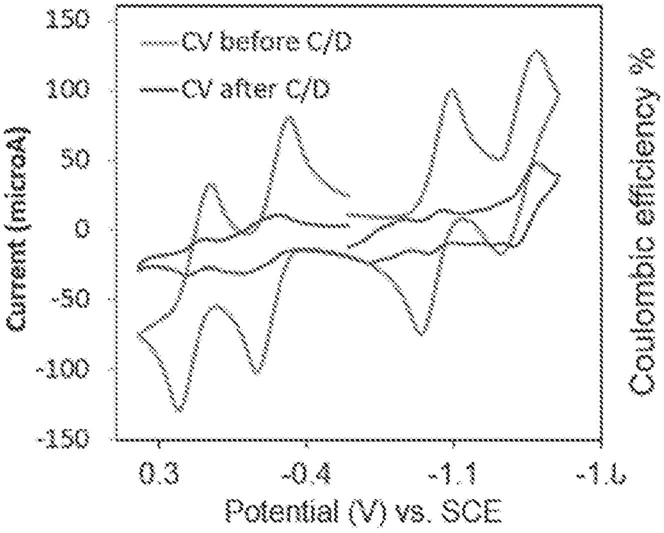
Figure 17C:
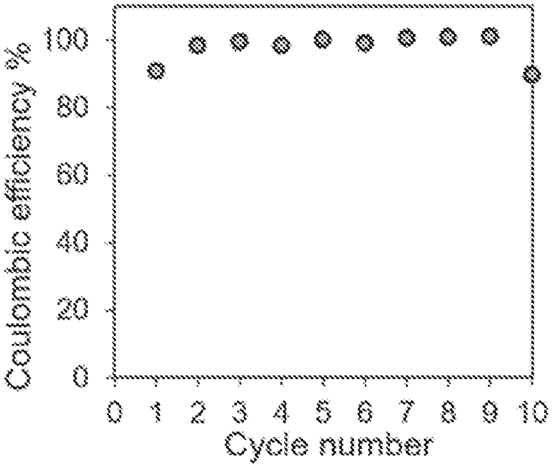

Complex 2b was also tested as an analyte in an asymmetric cell configuration because this allowed us to achieve a cell design where up to four electrons are stored during each charge and discharge cycle. Using an AEM as separator, potentials and currents were initially chosen to maximize the energy density of the cell: storing 4 electrons in the battery. Over 10 cycles and 45 h, a Coulombic efficiency of 98% was observed (FIGS. 17A-C). Decomposition of the analyte was observed after 45 h and this is likely connected with the large voltaic drops in charging and discharging plateaus that promote analyte decomposition in the counter compartment. An asymmetric cell with 2b functioning as a four-electron analyte could be revisited as AEM technology is refined.

Figure 18B:
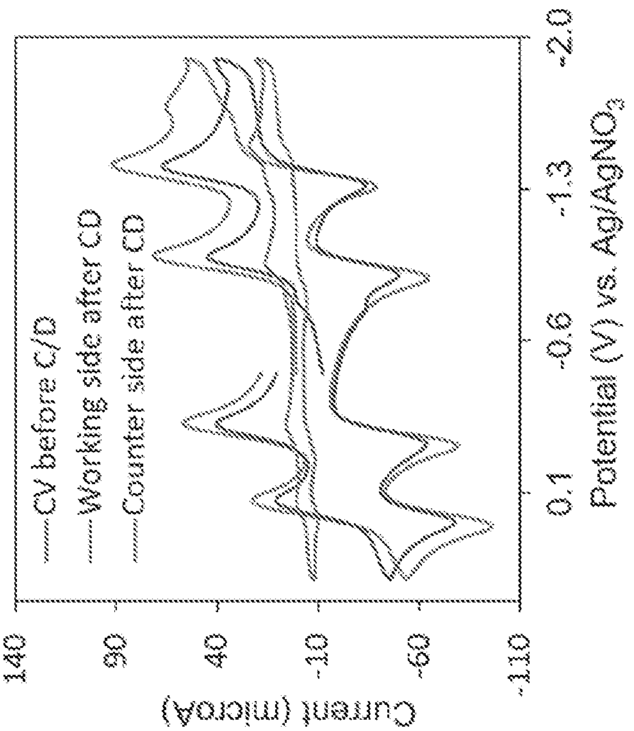
FIGS. 18A-B show results using an exemplary asymmetric H-cell battery with glass frit separator, with $V_{cell}$=1.6 V after <9 cycles over 21 h. (A) C/D; and (B) CV's. While the compound appears highly stable in the working side, crossover was prominent in the counter compartment.
Figure 18A:
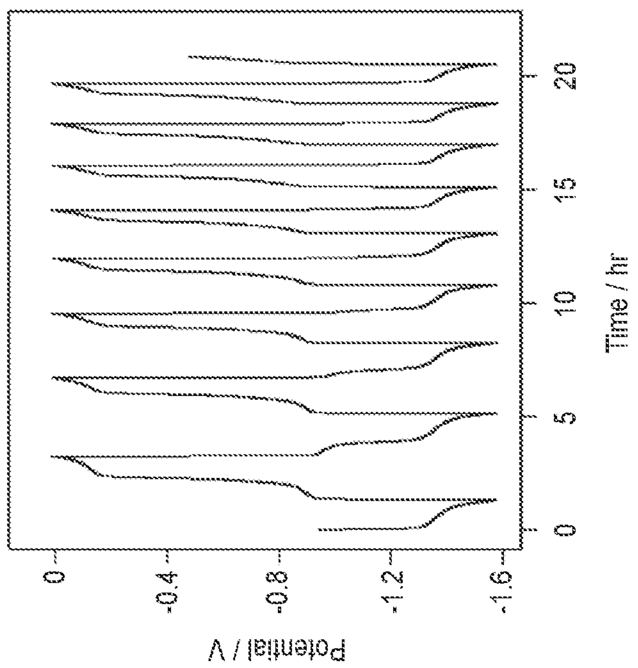
Figure 19A:
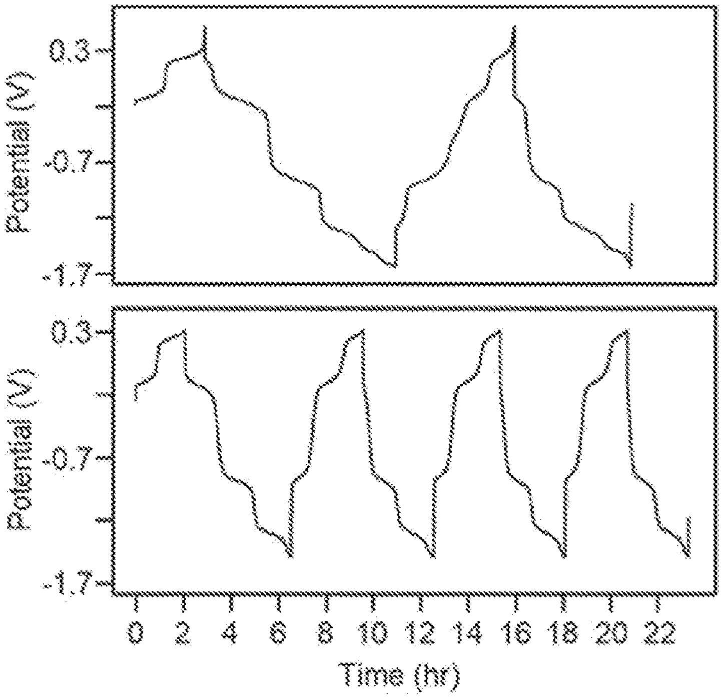
FIGS. 19A-B show potential response 2b using an exemplary asymmetric cell configuration with glass frit separator over 21 h for: (A) (upper) $V_{cell}$=2.1 V, n=4, over ~2 cycles; (lower) $V_{cell}$=1.9 V, n=3, over ~4 cycles; and (B) (left) CV's before and after C/D for experiment with $V_{cell}$=2.1 V, and (right) 1.9 V. Loss of the CV signal results primarily due to analyte crossover. New reduction feature at −1.7 V in "Working: CV after C/D" is uncoordinated $I_2P$ ligand.
Figure 19B:
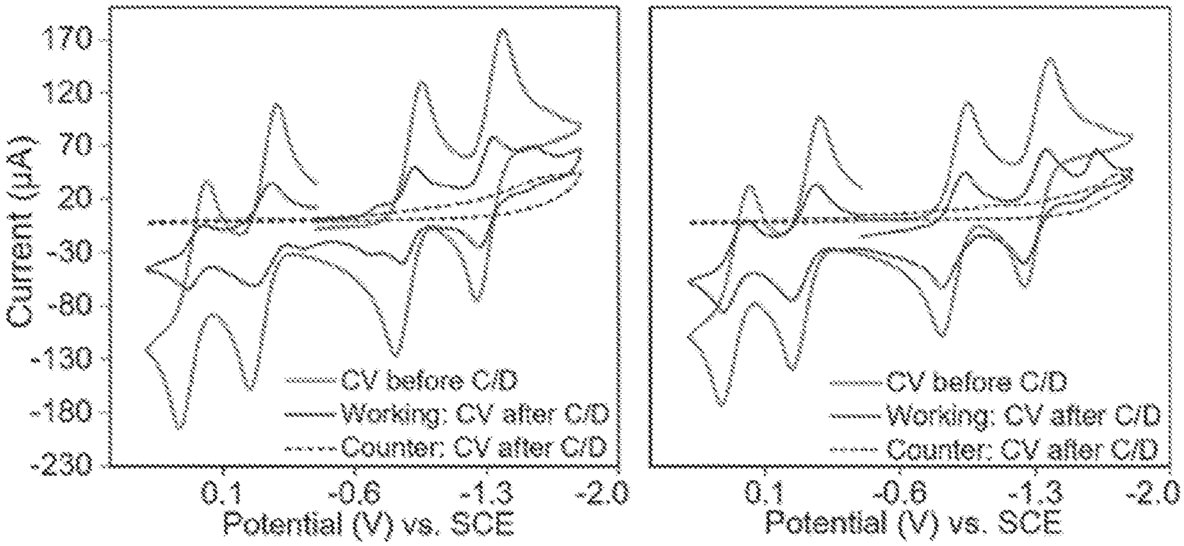
Figure 20:
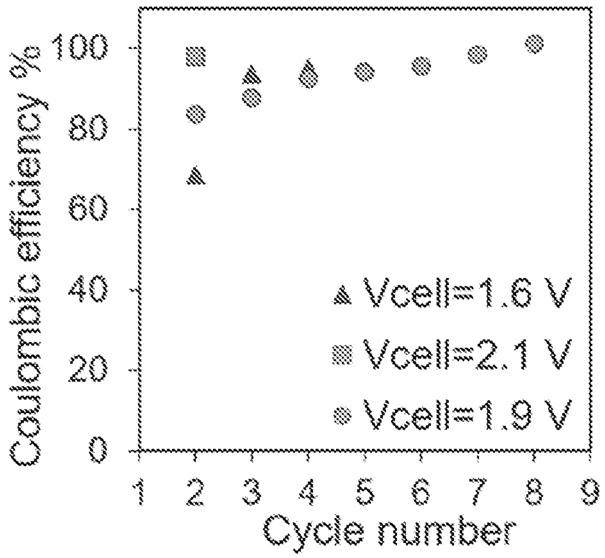
FIG. 20 shows Coulombic efficiency of each C/D cycle with an exemplary asymmetric H-cell battery with glass frit separator, with $V_{cell}$=1.6 V (square), $V_{cell}$=1.9 V (triangle) and $V_{cell}$=2.1 V (circle) over 21 h.

Charging and discharging experiments that access either 2, 3 or 4 of the analyte redox couples were also probed with an asymmetric cell using a glass frit as separator and those experiments correspond to $V_{cell}$=1.6, 1.9, and 2.1 V, respectively. In each experiment, significant crossover occurred within 20 h. With low charging currents that access only two of the redox events ($V_{cell}$=1.6 V), the analyte was observed via CV in the counter compartment after the experiment (FIGS. 18A-B). When higher charging currents were applied to access 3 or 4 of the redox events on 2b ($V_{cell}$=1.9 or 2.1 V), no intact analyte in the counter compartment could be observed using CV at the end of the experiments. This is attributed to degradation caused by the higher potentials that would be accessed in those experiments (FIGS. 19A-B). Coulombic efficiencies in each of the experiments, accessing n=2, 3, or 4, were 93%, 87%, and 98%, respectively (FIG. 20). The potential vs. time plots recorded over 21 h showed the well-defined plateaus that are expected as each of the charge states of 2b are accessed during charging and discharging (FIGS. 18A-B and 19A-B). These experiments show a proof-of-principle molecular analyte that can store four equivalents of charge.

Conclusions

An organo-aluminum analyte has been explored for application as an analyte in an NRFB. The analyte 2b has high solubility in MeCN and has electron transfer rates and diffusion coefficients suitable for application in an RFB. The analyte was explored using an H-cell model for a flow battery in both symmetric and asymmetric cell configurations. In the symmetric configuration, a glass frit separator promoted facile charging and discharging over 100 charge/discharge experiments spanning 450 h in 0.5 M $Bu_4NBF_4MeCN$ solution. Two electrons were passed in each charging and discharging cycle: a Coulombic efficiency over 97% was achieved during that time. Proof-of-principle experiments were also assessed in the asymmetric cell configuration despite interference from crossover through the glass frit which occurred within 21 h. Those asymmetric cells could be charged and discharged over voltage windows of 1.6, 1.9 or 2.1 V where 2, 3, or 4 electrons were stored in each cycle: Coulombic efficiencies of 93%, 87%, and 98%, respectively were obtained.

Future studies will test next-generation analytes, separators, and cell designs to optimize the storage of electrons in these multi-electron organo-aluminum molecular systems. Ongoing efforts are enabled by easy access to synthetic modifications of the $I_2P$ ligand scaffold and other redox-active ligands, which promote increases in solubility (Cactve), increased analyte size to minimize crossover, modifications to the operating potential window ($V_{cell}$), and increased numbers of electrons stored (n). All of these approaches promise future increases in energy density and battery lifetimes.

Experimental Methods

A. Electrochemical Measurements

Figure 21A:
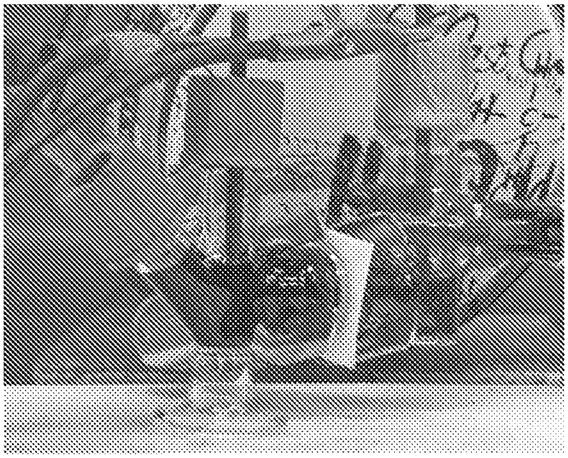
FIGS. 21A-B show H-Cell with anion-exchange membrane separator Ag/$AgNO_3$ reference electrode (left side port), graphite rod working and counter electrodes, according to one or more embodiments of the present disclosure. (A) shows darkening of working electrode compartment solution observed upon reaching low potential cutoff and (B) shows lightening of solution observed upon reaching high potential cutoff.
Figure 21B:
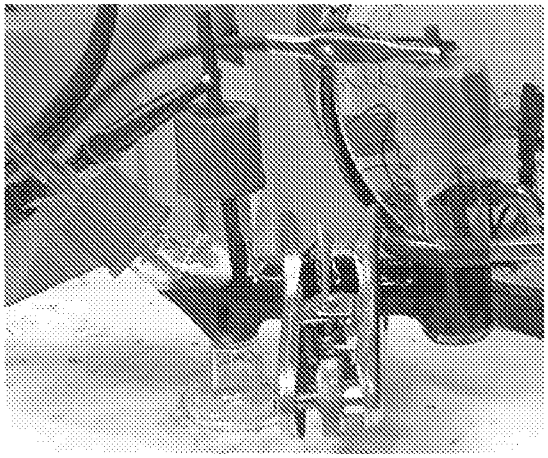
Figure 22:
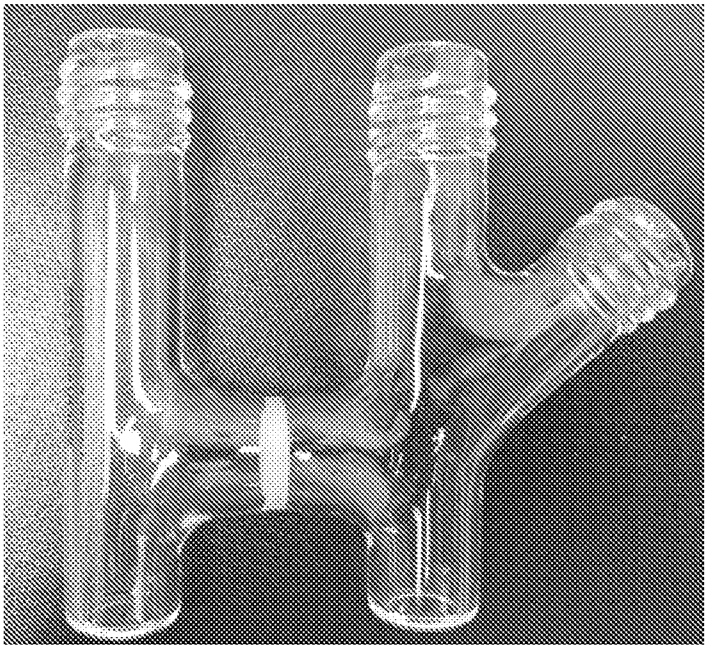
FIG. 22 shows an H-Cell with glass frit separator, from Adams and Chittenden Scientific Glass, according to one or more embodiments of the present disclosure.

Charge-discharge studies were performed inside of a glovebox under an inert atmosphere using a CH Instruments Electrochemical Analyzer Model 1400. The custom H-cell was designed by Adams and Chittenden (FIGS. 21A-B and 22) with compartments separated by an AMI-7001S Anion exchange membrane (Membrane International Inc.) or glass frit. If a membrane was used, it was soaked in 0.5 M $nBu_4NBF_4MeCN$ electrolyte solution for 48 h prior to use. The working compartment was fit with an $Ag/AgNO_3$ reference electrode, isomolded graphite rod (Graphite Store) working electrode and 7.5 mM of the complex in 3.5 mL 0.5 M $nBu_4NBF_4MeCN$ electrolyte solution. In the asymmetric studies, the counter compartment contained only 3.5 mL 0.5 M $nBu_4NBF_4MeCN$ electrolyte solution, and an isomolded graphite rod counter electrode. For the studies with a symmetric NRFB configuration, the first cycle was a galvanostatic charging of a concentrated solution of 2b to $2b^-$ (compounds shown in FIG. 2); 3.5 mL 0.5 M $nBu_4NBF_4MeCN$ electrolyte solution was charged to the counter compartment, and 3.5 mL 15 mM 2b in 0.5 M $nBu_4NBF_4MeCN$ electrolyte solution was charged to the working compartment. A 0.2 mA current was applied to the working compartment until a potential cut-off of −0.6 V was reached (approximately 2 hours). The electrolyte solution in the counter compartment was then discarded and 1.75 mL of the 15 mM $2b^-$ was charged to the counter compartment and both compartments were diluted to reach 3.5 mL of 7.5 mM $2b^-$. In both symmetric and asymmetric studies, a stirring rate of 900 RPM was found to be optimal for C/D studies. Between experiments, the electrodes were soaked and sonicated with 1M HCl, followed by distilled water twice, then acetone. They were then dried at 100° C. for two hours prior to use.

Cyclic voltammograms (CVs) were recorded in a nitrogen-filled glovebox with a CH Instruments Electrochemical Analyzer Model 620D or 1400 with a glassy carbon working electrode (CH Instruments, nominal surface area of 0.071 $cm^2$), a platinum wire auxiliary electrode, and an $Ag/AgNO_3$ (0.001M) non-aqueous reference electrode with a Vycor tip. All potentials are referenced to the SCE couple, and ferrocene was used as an external standard where the E/of ferrocene/ferrocenium is +0.40 V vs. SCE in 0.1 M $Bu_4NPF_6MeCN$. $Bu_4NPF_6$ was recrystallized from ethanol and placed under vacuum for 72 hours before electrolyte solutions were made. Electrolyte solutions were stored over 3 Å molecular sieves for at least 48 hours before use. Sieves were activated by heating under vacuum at 270° C. for at least 72 hours. UV-Vis spectra were obtained using a 1 cm cuvette using an Agilent 8453 UV-vis spectrophotometer.

B. X-Ray Structure Determinations

X-ray diffraction studies were carried out on a Bruker SMART APEXII, and a Bruker Photon100 CMOS diffractometer equipped with a CCD detector (SMART Software Users Guide, Version 5.1, Bruker Analytical X-Ray Systems, Inc.). Measurements were carried out at 90 K using Mo Kα (k=0.71073 Å) and Cu Kα (1.5418 Å) radiation. Crystals were mounted on a Kaptan Loop with Paratone-N oil. Initial lattice parameters were obtained from a least-squares analysis of more than 100 centered reflections; these parameters were later refined against all data. Data was integrated and corrected for Lorentz polarization effects using SAINT (SAINT Software Users Guide, Version 7.0, Bruker Analytical X-Ray Systems, Inc.) and were corrected for absorption effects using SADABS2.3 (SADABS, Version 2.03, Bruker Analytical X-Ray Systems, Inc.).

Space group assignments were based upon systematic absences, E statistics, and successful refinement of the structures. Structures were solved by direct methods with the aid of successive difference Fourier maps and were refined against all data using the SHELXTL 5.0 software package (SHELXTL Version 6.12, Bruker Analytical X-Ray Systems, Inc.). Thermal parameters for all non-hydrogen atoms were refined anisotropically. Hydrogen atoms, where added, were assigned to ideal positions and refined using a riding model with an isotropic thermal parameter 1.2 times that of the attached carbon atom (1.5 times for methyl hydrogens).

C. Other Physical Measurements $^1$H NMR spectra were recorded at ambient temperature using a Varian 600 MHz spectrometer. Chemical shifts were referenced to residual solvent. Elemental analyses were performed by the Microanalytical Laboratory at University of California Berkeley.

D. Solubility Studies of Complexes 1, 2a, 2b and 3

Stock solutions of each complex were prepared in acetonitrile. These were then diluted in 10 mL volumetric flasks to prepare four standard solutions. The absorbance of these four solutions were obtained and a suitable wavelength was chosen for a calibration curve of absorbance versus concentration. Saturated solutions were obtained by stirring excess complex in 400-500 μL of MeCN in a 20 mL vial. The solution was then filtered through a kimwipe pipette filter to remove undissolved material, and the saturated solution was then diluted in order for absorbances to fall within the absorption range of the calibration curve (FIG. 6A-C).

E. Preparation of Compounds

All manipulations were carried out using standard Schlenk or glove-box techniques under a dinitrogen atmosphere. Unless otherwise noted, solvents were deoxygenated and dried by thorough sparging with Ar gas followed by passage through an activated alumina column. Deuterated solvents were purchased from Cambridge Isotopes Laboratories, Inc. and were degassed and stored over activated 3 Å molecular sieves prior to use. Bis(imino)pyridine ($I_2P$), 1, 2a, and 3, were synthesized according to the literature. Other reagents were purchased from commercial vendors and used without further purification.

F. $[(I_2P^-)_2Al]$ [OTf] (2b).

Solid sodium (2.0 equiv., 0.603 mmol, 14.1 mg) was added to two equivalents of the $I_2P$ (300 mg, 0.603 mmol) dissolved in THF (10 mL). After stirring for 16 h, the solution was a dark green-brown color. One equivalent of $AlCl_3$ (0.302 mmol, 40.2 mg) dissolved in THF (3 mL) was added, resulting in a color change to a bright red solution which was stirred for one hour. Potassium trifluoromethanesulfonate (1.1 equiv., 0.333 mmol, 62.6 mg) dissolved in THF (2 mL) was added. After stirring overnight, the solution was removed in vacuo. Benzene (2×10 mL) was stirred with the oily solid for 1 h and then the mixture was filtered through celite and the celite pad was washed with fresh benzene. The benzene-insoluble oily solids were dissolved in acetonitrile (10 mL), filtered through the same celite pad and then concentrated to a red powder (254 mg, 73%). Single crystals suitable for X-ray diffraction were grown from a concentrated benzene solution over 16 h at room temperature. Anal. Calcd. for $C_{67}H_{54}AlF_3N_6O_7S\cdot 3H_2O$: C, 65.68; H, 4.94; N, 6.86. Found: C, 65.92; H, 4.88; N, 6.58. UV-Vis spectrum (MeCN) $\lambda_{max}$ ($\varepsilon_m$): 266 (25 600), 347 (16 700), 463 (br, 10 200) nm (L $mol^{-1}$ $cm^{-1}$). $\mu_{eff}=2.3\mu_B$.

Calculations

Calculation 1. Energy Density (Ê) Calculation.

The energy density (Ê) of a RFB is affected by the electrochemical properties given by equation 1.

$$\hat{E} = 0.5\ nV_{cell}C_{active}F \quad \text{(equation 1)}$$

where n is the number of electrons transferred, $V_{cell}$ is the electrochemical stability window, $C_{active}$ is the concentration of the electro-active analyte and F is Faraday's constant (96.485 kJ V $mol^{-1}$).

Calculation 2. Randles-Sevcik Equation to Calculation Diffusion Coefficients ($D_0$).

Figure 10:
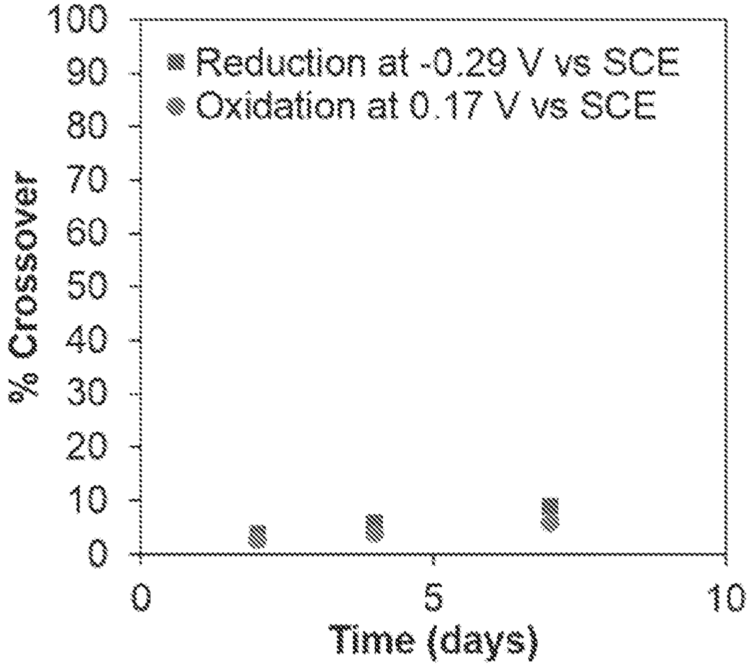
FIG. 10 Crossover of analyte 2b over time. Squares are the % crossover as measured from the reduction event at −0.29 V vs SCE (from calibration curve in FIG. 17B) and circles are % crossover as measured from oxidation event at 0.17 V vs SCE (FIG. 17C).
Figure 11A:
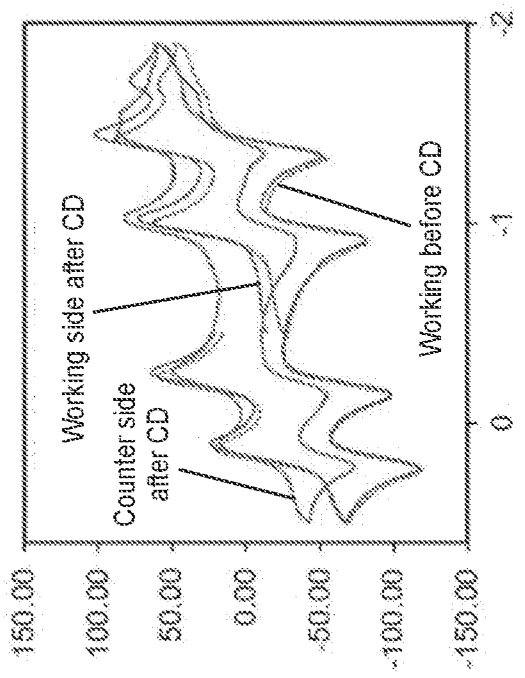
FIGS. 11A-B show CV's of working and counter compartments of charging and discharging of 2b in a symmetric H-cell using a glass frit separator: (A) after 73 h of charging and discharging of 2b in a symmetric H-cell using a glass frit separator and (B) after 450 h. CV's were taken by removing an aliquot from the H-cell after C/D experiments (glassy carbon button working, Pt wire counter, $Ag/AgNO_3$ reference electrodes).
Figure 11B:
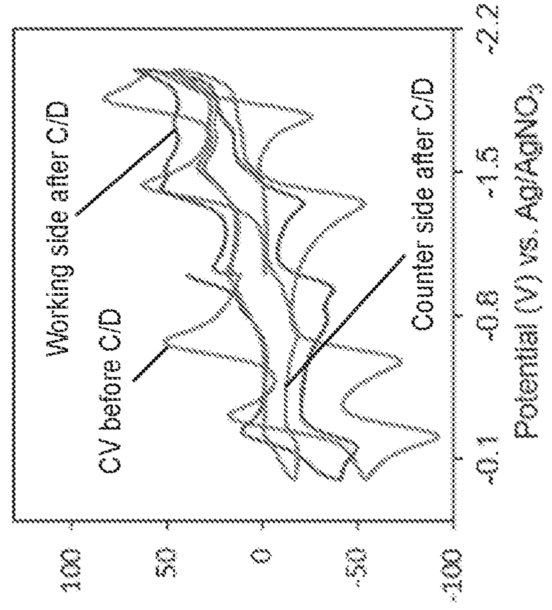

The diffusion coefficients for each redox couple were determined by first plotting CV's of 2b at varying scan rates (0.2-8 V/s) (FIG. 10). The diffusion coefficients were then determined from the slope of the peak current density ($j_p$) versus the square root of the scan rate ($\upsilon^{1/2}$):

$$j_p = 268600 n_e^{3/2} D_0^{1/2} C_0 v^{1/2} \quad \text{(equation 2)}$$

Calculation 3. Calculation of Heterogenous Electron-Transfer Rate Constant ($k_0$) Using the Nicholson Method.

Using equation 2, transfer parameter (ψ) was calculated by obtaining the peak to peak separation of each redox couple ($\Delta E_p$), at varying scan rates (0.2-8 V/s) (FIG. 10):

$$\psi = \frac{(-0.6288 + 0.0021\Delta E_p)}{1 - 0.017\Delta E_p} \quad \text{(equation 3)}$$

The electron transfer rate constant ($k_0$) was then extracted from the slope of a plot of versus $\upsilon^{1/2}$ (FIG. 10):

$$\psi = \frac{k_0}{\left(\frac{\pi nFD\upsilon}{RT}\right)^{\frac{1}{2}}} \quad \text{(equation 4)}$$

where n is the number of electrons transferred, F is the Faraday constant (96485 $Cmol^{-1}$), D is the averaged diffusion coefficient for the oxidation and reduction reaction ($D_O$ and $D_R$) ($cm^2/s$), υ is the scan rate (V/s), R is the ideal gas constant (8.314 J/mol-K) and T is the temperature (K).

Calculation 4.

Determination of 70% state of charge (SOC).

Theoretical capacity of the cell=0.0215 mmol×96, 485.33 sA/mol=2.07 sA=0.576 mAh 70% state of charge=0.403 mAh Galvanostatic charging current for 2 h at 70% SOC: 0.403 mAh/2 h=0.201 mA Galvanostatic discharging current for 2 h at 70% SOC: 0.403 mAh/2 h=0.201 mA where $j_p$ is the current density in $A/cm^2$, $n_e$ is the number of electrons (here $n_e$=1), $D_0$ is the diffusion coefficient ($cm^2/s$), $C_0$ is the bulk concentration (mol/mL) and v is the scan rate (V/s). Straight lines fit to these plots indicate that the electron transfer events can be considered reversible.

Other embodiments of the present disclosure are possible. Although the description above contains specific examples, these are presented for the purposes of illustration and description and should not be construed as limiting the scope of the disclosure. For example, combinations and sub-combinations of the specific features and aspects of the embodiments described above fall within the scope of this disclosure. Various features and aspects of the disclosed embodiments can be combined with or substituted for one another in order to form various embodiments. All structural, chemical, and functional equivalents to the elements of the above-described examples that are known to those of ordinary skill in the art are encompassed by the present claims. Thus, the scope the present disclosure should not be limited by the particular examples described above.

No element, component, or method step in the present disclosure is intended to be dedicated to the public regardless of whether the element, component, or method step is explicitly recited in the claims. Reference to an element in the singular is not intended to mean "one and only one" unless explicitly so stated, but rather "one or more." As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein. The scope of this disclosure should be determined by the appended claims and their legal equivalents

What is claimed is:

1. An organometallic complex for use as a Non-Aqueous Redox-Flow Battery (NRFB) analyte represented by formula I:

(I)

$$L_1—M—L_2$$

or a salt thereof, wherein M is a Group 13 metal and $L_1$ and $L_2$ are independently selected from bis (imino)pyridine compounds of Formula II:

(II)

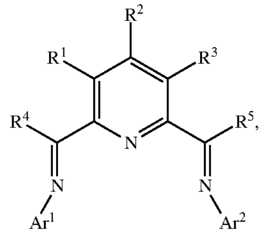

wherein $R^1$, $R^2$, and $R^3$ are independently selected from a hydrogen atom; hydrocarbon groups having one to twenty carbon atoms with optional inclusion of one or more heteroatoms selected from oxygen, nitrogen, silicon, sulfur, and halogen atoms, wherein the hydrocarbon group is attached to the pyridine ring by a carbon atom; halogen atoms; hydroxy groups; nitrile groups; amino groups —$NR^{11}R^{12}$; ether groups-OR; carboxamide groups —$C(O)NR^{11}R^{12}$ or —$NR^{11}C(O)R$; keto groups —C(O)R, carboxylic acid groups —C(O)OH or salt thereof; ester groups —C(O)OR; sulfonate groups; phosphonate groups; silyl groups, and nitrate groups; wherein $R^{11}$ and $R^{12}$ are independently selected from a hydrogen atom and hydrocarbon groups and R is a hydrocarbon group;

$R^4$ and $R^5$ are independently selected from a hydrogen atom; hydrocarbon groups having one to twenty carbon atoms with optional inclusion of one or more heteroatoms selected from oxygen, nitrogen, sulfur, and halogen atoms, wherein the hydrocarbon group is attached to the imine group by a carbon atom; and $Ar^1$ and $Ar^2$ are independently selected from substituted phenyl groups;

with the proviso that when $R^1$, $R^2$, and $R^3$ are hydrogen, and $R^4$ and $R^5$ are phenyl groups, $Ar^1$ and $Ar^2$ are not 2-methoxyphenyl groups.

2. The organometallic complex of claim 1, wherein $Ar^1$ and $Ar^2$ are independently selected from substituted phenyl groups according to Formula III:

(III)

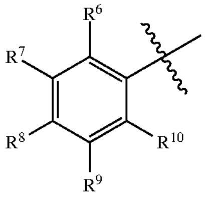

wherein at least one of $R^6$, $R^7$, $R^8$, $R^9$, and $R^{10}$ is selected from hydrocarbon groups having one to twenty carbon atoms with optional inclusion of one or more heteroatoms selected from oxygen, nitrogen, silicon, sulfur, and halogen atoms, wherein the hydrocarbon group is attached to the pyridine ring by a carbon atom; halogen atoms; hydroxy groups; nitrile groups; amino groups —$NR^{11}R^{12}$; ether groups-OR; carboxamide groups —C(O)$NR^{11}R^{12}$ or —$NR^{11}$C(O)R; keto groups-C(O)R, carboxylic acid groups-C(O)OH or salt thereof; ester groups-C(O)OR; sulfonate groups; phosphonate groups; silyl groups, and nitrate groups; wherein $R^{11}$ and $R^{12}$ are independently selected from a hydrogen atom and hydrocarbon groups and R is a hydrocarbon group with the proviso that when $R^1$, $R^2$, and $R^3$ are hydrogen, and $R^4$ and $R^5$ are phenyl groups, $Ar^1$ and $Ar^2$ are not 2-methoxyphenyl groups.

3. The organometallic complex of claim 1, wherein:

$R^1$ and $R^3$ are hydrogen, $R^2$ is chlorine, bromine, alkynyl, phenylethynyl, or TMS-ethynyl, $R^4$ and $R^5$ are phenyl groups, and $Ar^1$ and $Ar^2$ are independently a 2-, 3-, or 4-alkylphenyl group, a 2,3-dialkylphenyl group, a 2,4-dialkylphenyl group, a 3,4-dialkylphenyl group, a 2,3,4-trialkylphenyl group, a perhalophenyl group, a 2-, 3-, or 4-methoxyphenyl group, or a 2-, 3-, or 4-dimethylaminophenyl group.

4. The organometallic complex of claim 1, wherein M is Al, Ga, or In.

5. The organometallic complex of claim 4, wherein M is Al.

6. The organometallic complex of claim 1, wherein the complex is a salt with a counter ion selected from the group consisting of $AlCl_4^-$, $BPh_4^-$, $BF_4^-$, $PF_6^-$, $AsF_6^-$, $SbF_6^-$, $OTeF_5^-$, $OClO_3^-$, $(CF_3SO_2)_2N^-$ and $CF_3SO_3^-$.

7. The organometallic complex of claim 6, wherein the salt is represented by Formula IV:

(IV)

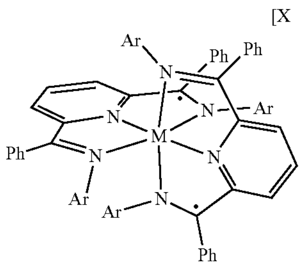

wherein M is Al, Ga, or In, Ph is phenyl, Ar is not 2-methoxyphenyl, and X is $PF_6^-$, $BF_4^-$, $(CF_3SO_2)_2N^-$, $CF_3SO_3^-$, or $AlCl_4$.

8. A Non-Aqueous Redox-Flow Battery (NRFB) comprising:

a negative compartment containing a negative electrode disposed within a non-aqueous liquid electrolyte solution; and a positive compartment containing a positive electrode disposed within the non-aqueous liquid electrolyte solution; and a separator interposed between the positive compartment and the negative compartment;

wherein at least one of the negative compartment and the positive compartment comprises an NRFB analyte comprising the organometallic complex of claim 1.

9. The NRFB of claim 8, wherein both the negative and positive compartments include the NRFB analyte.

10. The NRFB of claim 8, wherein the organometallic complex is dissolved in a non-aqueous solvent, optionally wherein the non-aqueous solvent is selected from the group consisting of acetonitrile, gamma-butyrolactone, a cyclic carbonate, propylene carbonate, ethylene carbonate, butylene carbonate, dimethyl carbonate, diethyl carbonate, N-methyl-2-pyrrolidone, N,N-dimethylformamide, N, N-dimethylacetamide, dimethylsulfoxide, dimethyl sulfone, sulfolane, chlorobenzene, cyclopentanone, tetrahydrofuran, 1,4-dioxane, methanol, ethanol, ethylene glycol, diethylene glycol, triethylene glycol, tetraethylene glycol, their mono or di-methyl ethers, 1,3-dioxolane, 1,2 propylene glycol, 1,3 propylene glycol and mixtures thereof.

11. The NRFB of claim 10, wherein the organometallic complex concentration in the non-aqueous solvent is about 5 mM to about 50 mM, about 5 mM to about 25 mM or about 5 mM to about 15 mM.

12. The NRFB of claim 8, wherein the positive and negative electrodes independently include C, Si, Ga, In, Al, Ti, V, Cr, Fe, Co, Ni, Cu, Zr, Nb, Ta, Mo, W, Re, Ru, Os, Rh, Ir, Pd, Pt, Ag, or Au, alloys thereof, degenerately-doped semiconductors thereof, or oxides thereof; graphite, carbon felt, glassy carbon, reticulated vitreous carbon, nickel on carbon, porous nickel sulfide, a carbon-polyolefin composite, a composite containing polyvinylidene difluoride (PVdF) and activated carbon, or a composite of platinum and titanium.

13. The NRFB of claim 8, wherein the positive and negative electrodes are graphite rods.

14. The NRFB of claim 8, wherein the separator includes alumina, silica, glass, titania, zirconia, or an anion exchange membrane, optionally the separator is a glass frit.

15. The NRFB of claim 8, wherein the liquid electrolyte solution further comprises a supporting electrolyte, optionally wherein the supporting electrolyte is selected from the group consisting of lithium, sodium, potassium, rubidium, magnesium, calcium, strontium, barium ammonium halides and organic ammonium halides, the group consisting of lithium phosphate, lithium hexafluorophosphate, lithium hexafluoroarsenate, lithium perchlorate, sodium perchlorate, lithium sulfate, magnesium sulfate, and ammonium perchlorate, or a mixture thereof.

16. The NRFB of claim 15, wherein the supporting electrolyte concentration is from about 0.01 M to about 10 M.

17. The NRFB of claim 8, wherein the NRFB is configured to establish electrical communication between the positive electrode, the negative electrode, and an external load directing electrical energy into or out of the NRFB, and/or to establish flow of the electrolyte solutions past the positive and negative electrodes, respectively.

18. The NRFB of claim 8, further comprising a storage tank containing additional electrolyte solution in fluidic communication with each of the positive and negative compartments.

19. A method of releasably storing electrical energy comprising connecting the NRFB of claim 8 to an external power source and charging the NRFB to make a current to flow in, whereby the NRFB can be discharged by connecting it to an external circuit having an electric load to make a current to flow out.

20. The method of claim 19, wherein the NRFB is connected to an electrical grid to allow renewables integration, peak load shifting, grid firming, baseload power generation and consumption, energy arbitrage, transmission and distribution asset deferral, weak grid support, frequency regulation, or any combination thereof.

* * * * *